US012217564B2

(12) United States Patent
Hou

(10) Patent No.: US 12,217,564 B2
(45) Date of Patent: Feb. 4, 2025

(54) BANKNOTE VALIDATION DEVICE AND PROCESSING INSPECTION APPARATUS

(71) Applicant: Alpha Hou, Las Vegas, NV (US)

(72) Inventor: Alpha Hou, Las Vegas, NV (US)

(*) Notice: Subject to any disclaimer, the term of this patent is extended or adjusted under 35 U.S.C. 154(b) by 177 days.

(21) Appl. No.: 18/167,901

(22) Filed: Feb. 13, 2023

(65) Prior Publication Data

US 2023/0260354 A1 Aug. 17, 2023

(51) Int. Cl.

| | |
|---|---|
| ***G07D 7/121*** | (2016.01) |
| ***B65H 3/52*** | (2006.01) |
| ***B65H 7/02*** | (2006.01) |
| ***G07D 7/162*** | (2016.01) |

(52) U.S. Cl.

CPC ........... *G07D 7/121* (2013.01); *B65H 3/5261* (2013.01); *B65H 7/02* (2013.01); *G07D 7/162* (2013.01)

(58) Field of Classification Search

CPC .......... G07D 7/121; G07D 7/162; G07D 7/17; G07D 7/12; B65H 3/5261; B65H 7/02; B65H 2511/12; B65H 2511/24; B65H 2553/416; B65H 2701/1912; B65H 7/06; B65H 7/14

USPC .......................................................... 356/71

See application file for complete search history.

(56) References Cited

U.S. PATENT DOCUMENTS 9,313,855 B1 * 4/2016 Sivertsen ............... H05B 47/11
2020/0400791 A1 * 12/2020 Fujiwara .................. G01C 3/06

* cited by examiner

*Primary Examiner* — Md M Rahman

(57) ABSTRACT

A banknote validation device includes a light source array which includes multiple light emission units; a light receiver configured to receive light emitting from the light emission units and to generate, upon receiving the light emitting from the light emission units, a detection signal corresponding thereto; a banknote channel arranged between the light source array and the light receiver; and a control circuit electrically connected to the light source array and the light receiver. The banknote channel is configured to receive a banknote to be validated to pass therethrough. The light receiver is arranged to correspond to multiple light emission units. The control circuit is configured to control the light emission units of the light source array to sequentially emit light according to a preset timing sequence of lighting. The present invention allows for inspection of a banknote to be validated with a simplified structure at the same accuracy.

20 Claims, 18 Drawing Sheets

Cam displacement manner 3

BANKNOTE VALIDATION DEVICE AND PROCESSING INSPECTION APPARATUS

BACKGROUND OF THE INVENTION

Field of the Invention

The present invention generally relates to the technical field of banknote validation, and more particularly to a banknote validation device and a processing apparatus that inspection the correct moving and the defect banknote.

Description of the Related Art

To validate a banknote, inspection in respect of the banknote width and whether the banknote has defects must be conducted. Since different banknotes often have different widths, while the entrance of a banknote validation apparatus is always fixed, a centering device is a must for moving a banknote to the middle of the entrance in order to allow a subsequent operation of inspection to be carried out properly. For example, European Patent Publication EP 3291186 B1 (of which a counterpart Chinese patent application is CN 201480024536.5), entitled "Banknote Alignment System for Banknote Validator" discloses a driving roller and a driven roller that are used to have a banknote moving along a banknote path during validation of the banknote. However, such a solution involves a complicated mechanism for moving the banknote, and thus, the cost is excessively high.

SUMMARY OF THE INVENTION

The present invention provides a banknote validation device and a processing apparatus to resolve the technical issues that the existing banknote validation device requires an alignment system of which the structure is complicated to correctly validate a banknote.

The technical solution that the present invention adopts is as follows:

In a first aspect, the present invention provides a banknote validation device, which comprises:

a light source array, which comprises a number of light emission units arranged in at least one row; wherein a distance and a position of each of the light emission units are fixed, and that is a detected position of each of the light emission units is fixed information.

at least one light receiver, which is operable to receive light emitting from the light emission units and to generate, upon receiving the light emitting from the light emission units, a detection signal corresponding thereto;

a banknote channel, which is arranged between the light source array and the light receiver, the banknote channel being adapted to receive a banknote to be validated to pass therethrough, the at least one light receiver being arranged to correspond to multiple light emission units of the light source array, such that when no banknote is present in the banknote channel, the light emitting from the light emission units toward the banknote channel is all receivable by the light receiver corresponding thereto; and when the banknote to be validated is passing through the banknote channel and blocks the light emitting from at least a portion of the light emission units, the light emitting from the light emission units that are blocked toward the banknote channel is unreceivable by the corresponding light receiver; and a control circuit, which is electrically connected to the light source array and the light receiver, the control circuit being operable to control the light emission units of the light source array to sequentially emit light according to a preset timing sequence of lighting, the control circuit being operable to implement inspection of the banknote passing through the banknote channel according to the detection signal generated by the light receiver.

In a second aspect, the present invention provides a banknote inspection method, which comprises the following steps:

acquiring a preset timing sequence of lighting for the light emission units of the light source array;

controlling the light emission units of the light source array to sequentially emit light according to the preset timing sequence of lighting to illuminate the banknote channel;

acquiring the detection signal that is generated by the light receiver upon receiving the light emitting from the light emission units; and identifying presence/absence of the banknote in the banknote channel, and/or a width of the banknote, and/or presence of a defect in the banknote, and/or the banknote being skew or not according to the detection signal received by the light receiver and the preset timing sequence of lighting.

In a third aspect, the present invention provides a banknote processing apparatus, which comprises the banknote validation device of the first aspect.

Beneficial effects: The present invention provides light emission units that are arranged along a banknote channel in an array mode, and a light receiver that is operable to receive light emitting from the light emission units and arranged on the other side of the banknote channel. When a banknote is passing through the banknote channel, light emitting from a portion of the light emission units is blocked, and only light emitting from unblocked ones of the light emission units not blocked will be received by the light receiver. Thus, the present invention may quickly and accurately identify if a banknote is present in the banknote channel, the size of the banknote, the banknote being skew or not, and a defect of the banknote according to the situation of the light from the light emission units being blocked. In this way, the present invention does not need a banknote centering mechanism to center the banknote. Thus, the structure of the present invention is made simpler. The present invention arranges the light receiver to correspond to multiple ones of the light emission units of the light source array, and the cost of the light emission units is low, so that the number of the light receivers required can be greatly reduced, thereby significantly reducing the cost. The present disclosure makes the light emission units to emit light in sequence so as to achieving one light receiver receiving light emitting from multiple light emission units, thereby reducing overall energy consumption of the light source array, avoiding mutual interference between the light emission units, and further improving precision of banknote validation.

BRIEF DESCRIPTION OF THE DRAWINGS

To more clearly expound the technical solution of embodiments of the present invention, a brief description will be provided below for the drawings that are necessary for the illustration of the embodiments of the present invention. Those having ordinary skill in the art may envisage, based on the attached drawings, other drawings without creative endeavor, and these are all considered within the scope of protection of the present invention.

DETAILED DESCRIPTION OF EMBODIMENTS

Embodiment 1

Figure 1:
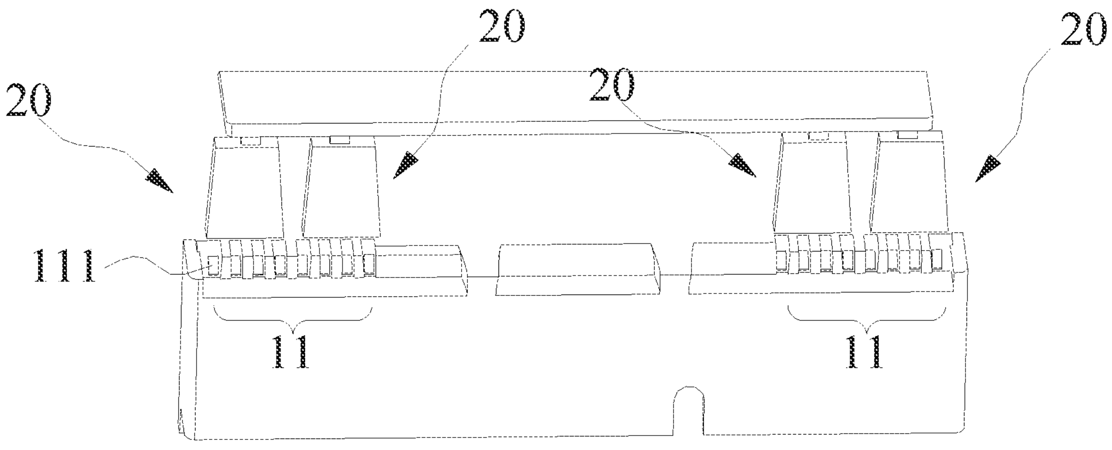
FIG. 1 is a perspective view showing a banknote validation device entrance portion according to the present invention.
Figure 2:
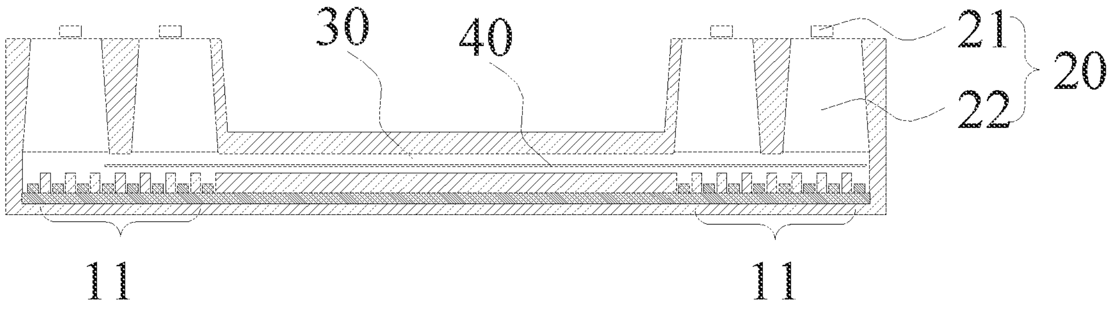
FIG. 2 is a cross-sectional view showing the banknote validation device entrance portion according to the present invention.

As shown in FIGS. 1 and 2, the instant embodiment provides a banknote validation device, which comprises a light source array 11, at least one light receiver 20, and a banknote channel 30.

Figure 4:
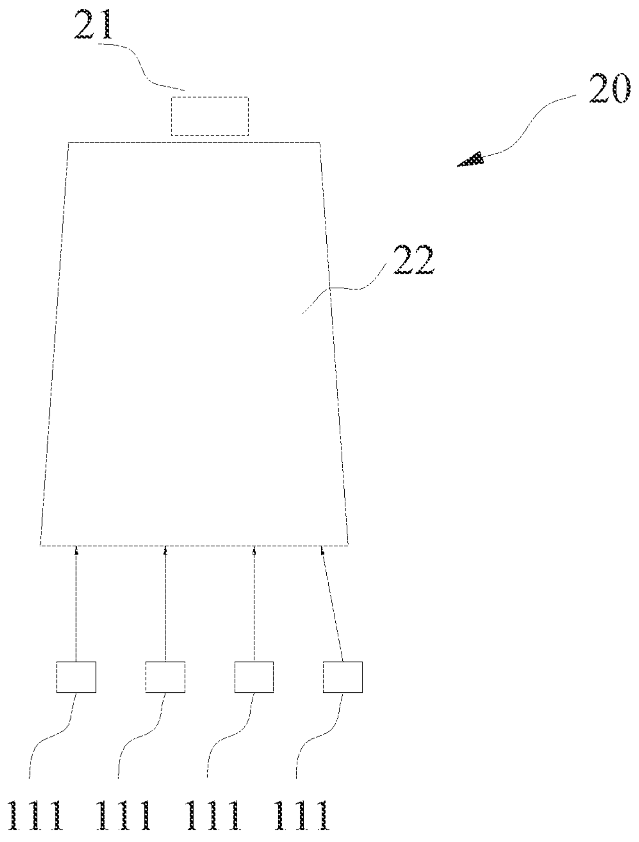
FIG. 4 is a schematic view showing a structure of the light receiver of the present invention.

As shown in FIG. 4, the light source array 11 comprises a number of light emission units 111 arranged in a row. The number of the light emission units 111 is greater than or equal to 2. The light emission units 111 can be light-emitting diode (LED) lights.

In this embodiment, the light receiver 20 is operable to receive light emitting from the light emission units 111, and to generate, upon receiving the light emitting from the light emission units 111, a detection signal corresponding thereto. As shown in FIG. 2, the light emission units 111 are arranged in a widthwise direction of the banknote channel 30.

Figure 3:
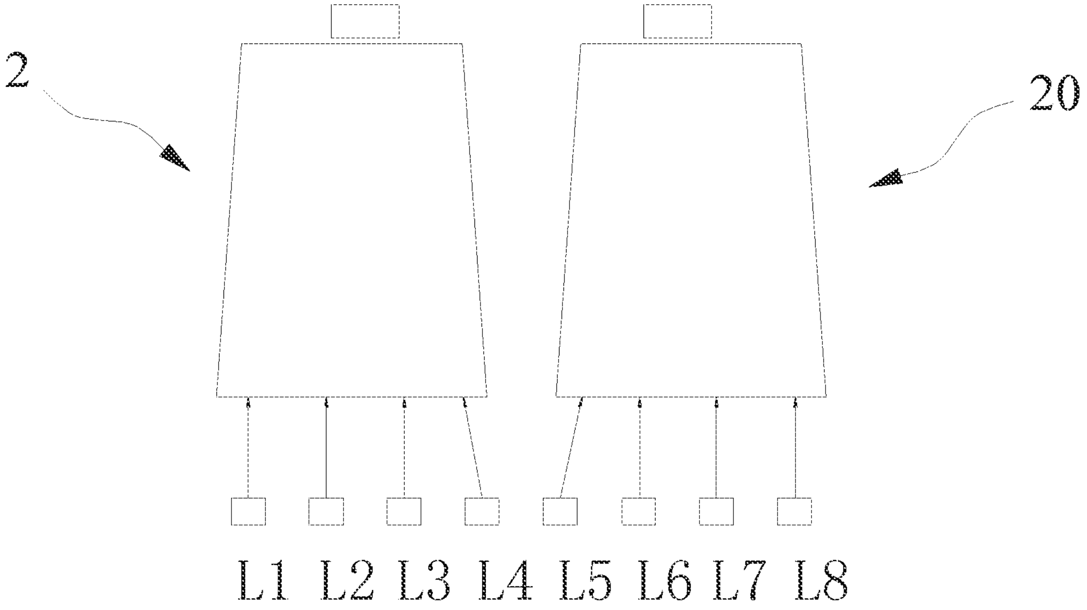
FIG. 3 is a schematic view showing a corresponding relationship between light emission units and a light receiver of the banknote validation device according to the present invention.

In the instant embodiment, the at least one light receiver 20 is arranged to correspond to multiple ones of the number of light emission units 111 of the light source array 11. In other words, the light receiver 20 and the light emission units 111 are arranged in a manner of one corresponding to multiple, and such multiple light emission units 111 are arranged at a location as close to the light receiver 20 that they are corresponding to as possible. For example, the at least one light receiver includes two light receivers 20, wherein a first light receiver 20 corresponds to "n" light emission units 111, while a second light receiver 20 corresponds to "m" light emission units 111, where "m" can be equal to or not equal to "n". Accordingly, the "n" light emission units 111 are arranged at a location close to the first light receiver 20, so that no obstacle may exist therebetween and light emitting from any one of the "n" light emission units 111 can be received by the first light receiver 20. The "m" light emission units 111 are arranged at a location close to the second light receiver 20, no obstacle may exist therebetween and light emitting from any one of the "m" light emission units 111 can be received by the second light receiver 20. For example, the four light emission units 111 shown in the left side of FIG. 3 correspond to the light receiver 20 on the left side, while the four light emission units 111 on the right side correspond to the light receiver 20 on the right side.

No new detection signal will be generated if the light receiver 20 continuously receives the light emitting from the light emission units 111, and the light receiver 20 generates a detection signal when the light receiver 20, in a state of not detecting any light from the light emission units 111, becomes detecting light emitting from one of the light emission units 111. When light that is currently received by the light receiver 20 does not persist and becomes vanishing after a period of time, and the light receiver 20, once re-detecting and receiving light emitting from one of the light emission units 111 afterwards, generates a new detection signal. The detection signal can be an electrical signal.

A banknote 40 to be validated is fed to pass through the banknote channel 30. The banknote channel 30 has a banknote entry opening at an outer side thereof. The banknote 40 is fed through the banknote entry opening into the banknote channel 30, and moves in a direction toward inside of the banknote channel 30.

In the instant embodiment, the banknote channel 30 is arranged on two sides of the banknote channel 30, so that the banknote channel 30 is located between the light source array 11 and the light receiver 20, and during the course of passing through the banknote channel 30, the banknote 40 passes between the light source array 11 and the light receiver 20.

As shown in FIG. 2, with the banknote channel 30 being arranged at such a location as described above, when the light emission units 111 are put into operation, light emitting from the light emission units 111 transmits toward the banknote channel 30. In case that no banknote 40 is present in the banknote channel 30, the light emitting from the light emission units 111 toward the banknote channel 30 is not blocked by the banknote 40, and the light is received by the light receiver 20 corresponding to the light emission units 111. In case that a banknote 40 to be validated is moving through the banknote channel 30, the banknote 40 blocks light emitting from some or all of the light emission units 111, and for the ones of the light emission units 111 that are so blocked, the light emitting therefrom the toward the banknote channel 30 is blocked and will not be received by the light receiver 20 corresponding thereto.

In the instant embodiment, a control circuit is provided and electrically connected with the light source array 11 and the light receiver 20. The control circuit controls the light emission units 111 of the light source array 11 to light up in a predetermined timing sequence of lighting. The control circuit is operable to perform a inspection operation on the banknote 40 passing through the banknote channel 30 according to the detection signal generated by the light receiver 20.

The timing sequence of lighting refers to timing of being light up for each individual one of the light emission units 111. For the light emission units 111 that correspond to a same one of the at least one light receiver 20, the timings of lighting of such light emission units 111 are different, and to ensure accuracy of detection, at a specific given time point, among all such light emission units 111, only one of the light emission units 111 is allowed to emit light. When a specific light emission unit 111 of the light emission units 111 emits light, if it is not blocked by a banknote 40, then the light receiver 20 corresponding thereto may receive the light emitting from the specific light emission unit 111 and generates a detection signal. Thus, based on the time point when the light receiver 20 generates the detection signal and the predetermined timing sequence of lighting, it is possible to identify which one of the light emission units 111 emits the light that is so received. For light emission units 111 that correspond to different ones of the at least one light receiver 20, they can be distinguished from each other according to which one of the at least one light receiver 20 that generates the detection signal, and thus, the time points of lighting of the light emission units 111 that correspond to different light receivers 20 can be different, or the same.

As shown in FIG. 4, as an optional but preferable way of embodiment, the light receiver 20 of the instant embodiment comprises a receiving device 21 and a light guide 22. The light guide 22 collects and transmits light emitting from the light emission units 111 corresponding to the light receiver 20 toward the receiving device 21, and the receiving device, upon receiving the light, generates the detection signal.

In the instant embodiment, each light receiver 20 may correspond to multiple ones of the light emission units 111, and to have light emitting from all the multiple light emission units 111 that correspond to the light receiver 20 to be reliably received by the light receiver 20 if not blocked, the instant embodiment uses the light guide 22 to collect light emitting from the light emission units 111 corresponding thereto. Each light guide 22 corresponds to one receiving device 21. Light emitting from the light emission units 111 is conducted by the light guide 22 to accurately reach a receiving position of the receiving device 21. The light guide 22 can be a light-receiving column, and the receiving device 21 can be a receiving tube.

Further, as an optional but preferable way of embodiment, the banknote validation device according to the instant embodiment may further comprise a light reflecting device. The light reflecting device functions to reflect light from the light emission units 111 toward outside of the banknote entry opening. In other embodiments, light emission units of a large angle can be adopted, and such large-angle light emission units may redirect light toward the receiving device and outside of the banknote entry opening simultaneously.

In the instant embodiment, being adjacent to the light source array 11 means the light reflecting device or light emission device may redirect or reflect light emitting from the light emission units 111 of the light source array 11 toward outside of the banknote validation device, so as to allow a user to clearly observe the light emitting from the light source array 11. The control circuit may control the light emission units 111 of the light source array 11 to sequentially light up in the entry direction of the banknote 40, so that the user may be readily aware of the position and direction that a banknote 40 correctly enters a monitoring device according to the light reflected to the outside of the banknote validation device, and may also controls the light emission units 111 of the light source array 11 to light up according to a predetermined rule, so that various reminder or alarm signals may be generated by means of different effects of lighting.

As an optional but preferable way of embodiment, the light source array 11 of the instant embodiment includes two sets and the two sets of the light source array 11 are respectively arranged at two opposite ends of the banknote channel 30. A banknote 40 is often first found a defect at an edge, and the width and skewness of a banknote 40 can be identified by inspecting blocking of light by two sides of the banknote 40 in the widthwise direction thereof. Accordingly, in the instant embodiment, the two sets of the light source array 11 are respectively and elaborately arranged at the two opposite ends of the banknote channel 30. This greatly reduces the number of the light emission units 111 required for the same degree of accuracy of detection, and the energy consumption is significantly reduced. Controlling of the timing sequence of lighting of the light emission units 111 is thus simple, and the data required for processing for inspection of the banknote 40 is remarkably reduced, and the time for inspecting the banknote 40 is also greatly shortened.

Embodiment 2

Figure 5:
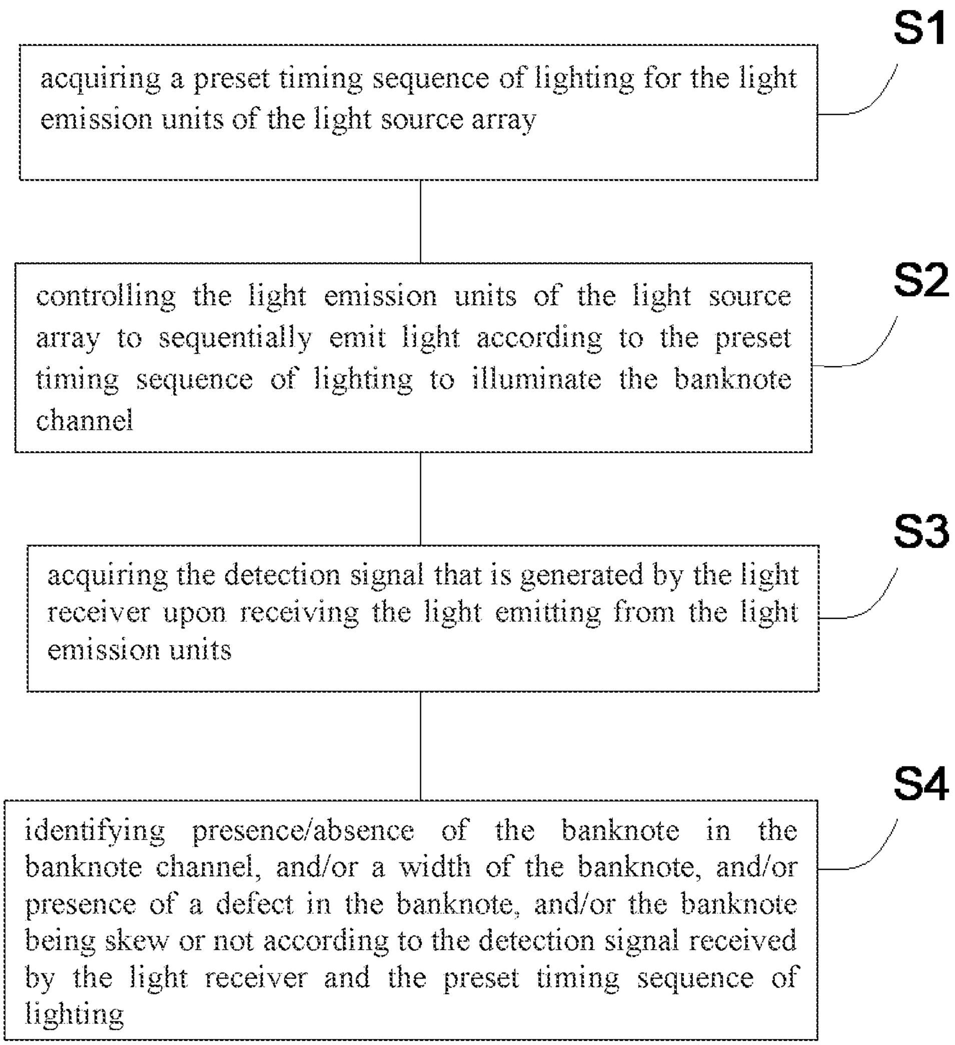
FIG. 5 is a flow chart showing a banknote inspection method according to the present invention.

As shown in FIG. 5, the instant embodiment provides a banknote inspection method. The method uses the banknote validation device of EMBODIMENT 1 to carry out inspection of a banknote. The method comprises the following steps:

S1: acquiring a preset timing sequence of lighting for the light emission units of the light source array;

wherein the preset timing sequence of lighting is pre-prepared and stored, and the preset timing sequence of lighting is retrieved during inspection.

S2: controlling the light emission units of the light source array to sequentially emit light according to the preset timing sequence of lighting to illuminate the banknote channel;

in the step, the light emission units are controlled to sequentially light up according to the preset timing sequence of lighting, and when a time point for a designated one of the light emission units to light up is reached, the light emission unit emits light.

S3: acquiring the detection signal that is generated by the light receiver upon receiving the light emitting from the light emission units;

when the light emission units are emitting light, the light receiver is also in an operation state, and the light receiver, upon receiving the light emitting from the light emission units, generates a detection signal corresponding thereto.

S4: identifying presence/absence of the banknote in the banknote channel, and/or a width of the banknote, and/or presence of a defect in the banknote, and/or the banknote being skew or not according to the detection signal received by the light receiver and the preset timing sequence of lighting;

in the step, light emitting from each of the light emission units being blocked or not is detected according to the timing sequence of lighting and the detection signal received by the light receiver, and then, identification of presence/absence of a banknote in a banknote channel, and/or a width of a banknote, and/or presence of a defect in a banknote, and/or a banknote being skew or not is carried out according a condition of the light of each light emission unit being blocked or not.

The operation of detecting light emitting from each light emission unit being blocked or not according to the timing sequence of lighting and the detection signal received by the light receiver comprises the following steps:

S401: obtaining a time point of lighting for each of the light emission units according to the preset timing sequence of lighting;

S402: for a group of light emission units that correspond to a same light receiver, determining, according to the time point of lighting of each of the light emission units, whether a detection signal corresponding thereto is generated; and

S403: for each light emission unit required to emit light according to the preset timing sequence of lighting, if a detection signal is generated at a time point of lighting, then light emitting from the light emission unit is blocked, and if no detection signal is generated at the time point of lighting, then light emitting from the light emission unit is not blocked.

The step is applied to the light emission units that are required to emit light according to the preset timing sequence of lighting. If some of the light emission units are not required to emit light according to the preset timing sequence of lighting, then they are not applicable in this step.

For example, for light emission units L1, L2, L3, and L4 belonging to the same group corresponding to the same light receiver and set to emit light at time point t1, time point t2, time point t3, and time point t4 according to the preset timing sequence of lighting, if the light receiver generates a detection signal at time point t3 and time point t4 only, this indicates that light emitting from the light emission units L1 and L2 is not received by the light receiver. Consequently, the light emitting from L1 and L2 is not blocked by a banknote. And, light emitting from the light emission units L3 and L4 is not received by the light receiver, and consequently, the light emitting from L3 and L4 is not blocked by a banknote. To ensure the accuracy of detection, the time point of light emission for each of the light emission units is not coincident with each other. For example, the light emission units L1 emits light at time point t1 and stops emitting light before other time points of light emission arrive, and similarly, the other light emission units of the group of light emission units, after the time point of light emission, stops emitting light before the time points of light emission of the other ones of the light emission units arrive.

Figure 6:
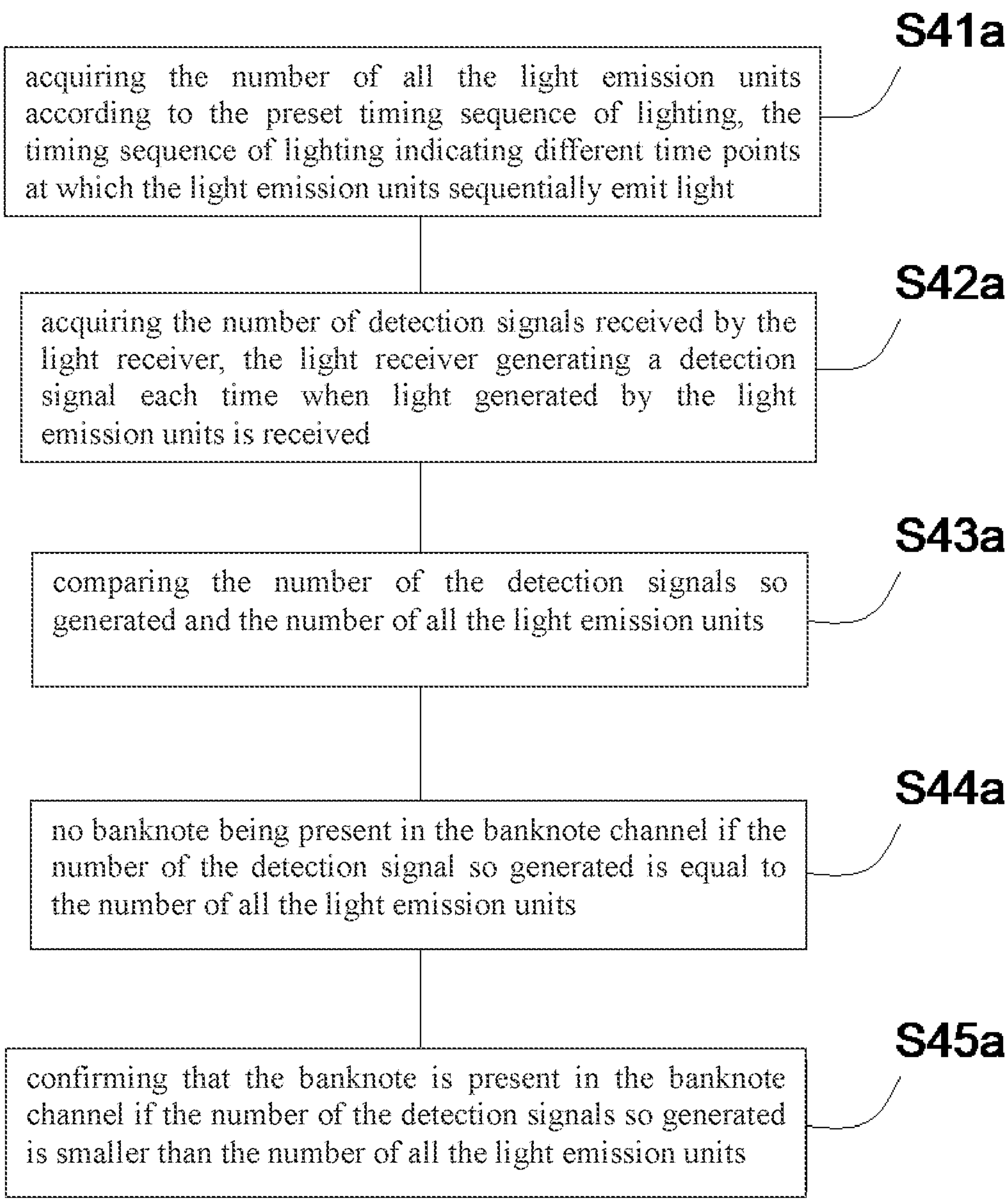
FIG. 6 is a flow chart showing a method for detecting if a banknote is present in a banknote channel according to the present invention.

As shown in FIG. 6, on the basis of the previous solution, the instant embodiment also provides a specific method for identifying if a banknote is present in the banknote channel or not. Step S4: identifying presence/absence of a banknote in a banknote channel, and/or a width of a banknote, and/or presence of a defect in a banknote, and/or a banknote being skew or not according to the detection signal received by the light receiver and the preset timing sequence of lighting comprises the following steps:

S41*a*: acquiring the number of all the light emission units according to the preset timing sequence of lighting, the timing sequence of lighting indicating different time points at which the light emission units sequentially emit light;

for example, two sets of light source array are respectively arranged at two ends of the banknote channel, and each set of light source array comprises 8 light emission units. The light emission units of each set of light source array emit light according to a predetermined sequence.

S42*a*: acquiring the number of detection signals received by the light receiver, the light receiver generating a detection signal each time when light generated by the light emission units is received;

in this embodiment, each of the light emission units emits light for one time, and if the light emitting from the light emission unit is not blocked by the banknote, then the light receiver generates a detection signal, and if the light emitting from the light emission unit is blocked by a banknote, then the light receiver does not generate a corresponding detection signal.

S43*a*: comparing the number of the detection signals so generated and the number of all the light emission units;

S44*a*: no banknote being present in the banknote channel if the number of the detection signal so generated is equal to the number of all the light emission units;

S45*a*: confirming that the banknote is present in the banknote channel if the number of the detection signals so generated is smaller than the number of all the light emission units.

For example, the two sets of light source array include 16 light emission units in total, and if light emitting from all the 16 light emission units is not blocked by a banknote in the banknote channel, then the light receiver generates 16 detection signals, and consequently, the number of the detection signals so generated is equal to the number of all the light emission units, and there is no banknote present in the banknote channel.

If a banknote is present in the banknote channel, then light emitting from some light emission units of the 16 light emission units will be blocked by the banknote in the banknote channel, and consequently, the light emitting from some light emission units will not be received by the light receiver. As such, the number of the detection signals generated by the light receiver is smaller than the number of the light emission units. For example, light emitting from 4 light emission units of the 16 light emission units is blocked by the banknote present in the banknote channel, and then, the number of the detection signals generated by the light receiver is 12, which is smaller than the number of the light emission units, which is 16.

On the basis of the previous solution, the instant embodiment also provides a specific method for identifying a size of a banknote. The method can be automatically implemented when it is identified that a banknote is present in the banknote channel, or can be implemented independently as desired.

In S2: controlling the light emission units of the light source array to sequentially emit light according to the preset timing sequence of lighting in order to illuminate the banknote channel, the light emission units are controlled to sequentially and cyclically emit light to illuminate the banknote channel, during a course when a banknote is gradually passing through the banknote channel.

During a inspection process, a banknote is caused to gradually pass through the banknote channel, and during such a process, the light emission units are controlled to sequentially and cyclically emit light. For example, for the 4 light emission units on the leftmost side of the banknote channel shown in the drawings, the four light emission units all correspond to the leftmost light receiver. The preset sequence of lighting for the four light emission units is that L1, L2, L3, and L4 follows the preset timing of sequence of lighting to sequentially emit light at time point t1, time point t2, time point t3, and time point t4, and once the one that emits light last, namely the light emission unit L4, finishes emission of light, L1, L2, L3, and L4 sequentially emit light again by following the preset timing sequence of lighting, and so on, until the operation of inspection is done.

Figure 7:
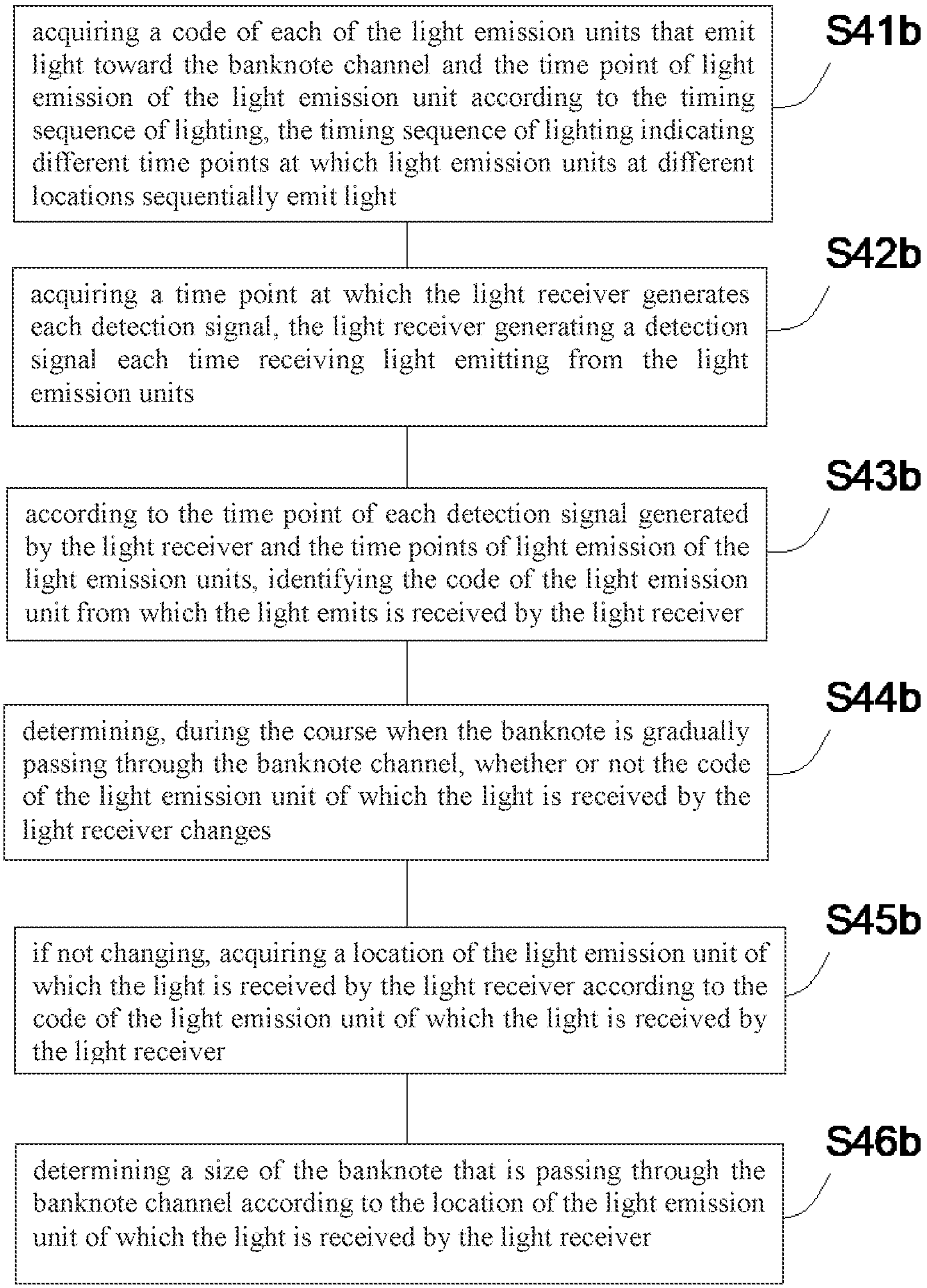
FIG. 7 is a flow chart showing a method for detecting a banknote size according to the present invention.
Figure 8:
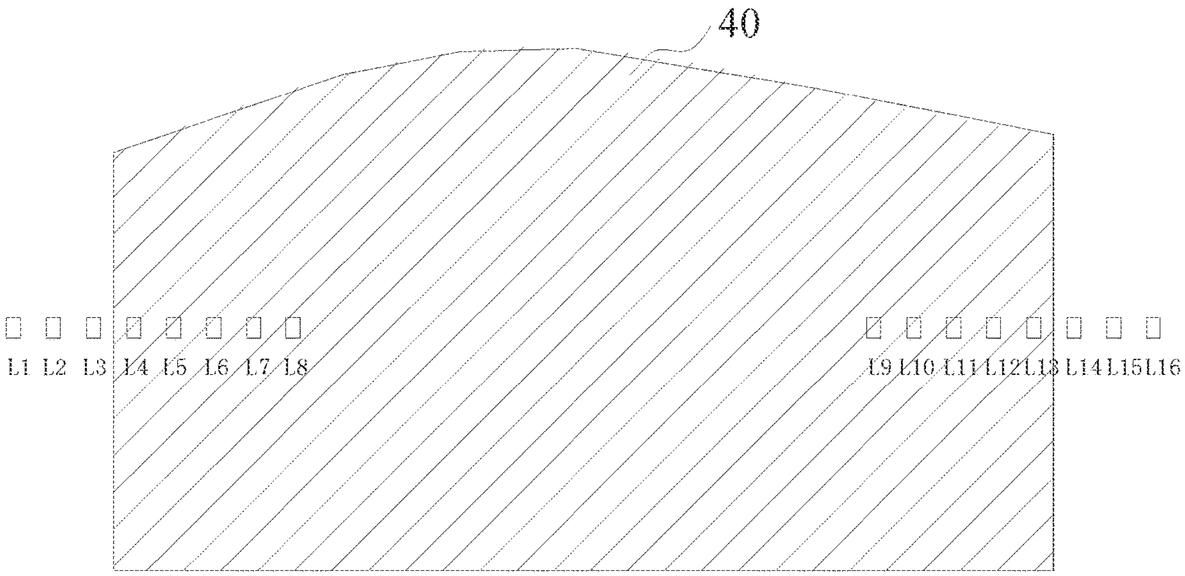
FIG. 8 is a schematic view showing a situation in which a banknote blocks the light emission units in detecting the banknote size.

As shown in FIG. 7, Step S4: identifying presence/absence of a banknote in a banknote channel, and/or a width of a banknote, and/or presence of a defect in a banknote, and/or a banknote being skew or not according to the detection signal received by the light receiver and the preset timing sequence of lighting further comprises the following steps:

S41*b*: acquiring a code of each of the light emission units that emit light toward the banknote channel and the time point of light emission of the light emission unit according to the timing sequence of lighting, the timing sequence of lighting indicating different time points at which light emission units at different locations sequentially emit light;

for easily identifying light emitting from which ones of the light emission units is blocked by a banknote, each of the light emission units is first assigned a code representing the identity thereof. For example, FIG. 8 shows 16 light emission units that are sequentially coded from left to right as L1, L2, L3, L4, L5, L6, L7, L8, L9, L10, L11, L12, L13, L14, L15, and L16. The 16 light emission units are set up at different locations along the direction of the banknote channel, and the 16 light emission units emit light at different time point in one cycle. This realizes light emission units of different locations emitting light in sequence at different time points. To ensure accuracy of detection, a time interval between the time points of light emission between two of the light emission units which are adjacent to each other in the lighting sequence is made sufficiently long.

S42*b*: acquiring a time point at which the light receiver generates each detection signal, the light receiver generating a detection signal each time receiving light emitting from the light emission units;

S43*b*: according to the time point of each detection signal generated by the light receiver and the time points of light emission of the light emission units, identifying the code of the light emission unit from which the light emits is received by the light receiver;

since a difference between the time when a light emission unit reflects light and the time when the receiver receives the light reflecting from the light emission unit is extremely small, it can be neglected. Thus, the step can be acquiring the time point of light emission for the light emission unit that is closest according to the time point when each detection signal is generated, and then determining the code of the light emission unit according to the time point of light emission of the light emission unit and the preset timing sequence of lighting.

For example, the light receiver generates detection signals at six time points of T1, T2, T3, T14, T15, and T16, and time points of light emission that are closest to the six time points are respectively t1, t2, t3, t14, t15, and t16. The light emission unit that emits light at time point t1 bears the code L1; the light emission unit that emits light at time point t2 bears a code of L2; the light emission unit that emits light at time point t3 bears a code of L3; the light emission unit that emits light at time point t14 bears a code of L14; the light emission unit that emits light at time point t15 bears a code of L15; the light emission unit that emits light at time point t16 bears a code of L16, and this indicates light from the 6 light emission units, L1, L2, L3, L14, L15, and L16, is not blocked by a banknote present in the banknote channel, and as shown in FIG. 8, light emitting from the remaining 10 light emission units, L4, L5, L6, L7, L8, L9, L10, L11, L12, and L13, is blocked by a banknote present in the banknote channel.

S44*b*: determining, during the course when the banknote is gradually passing through the banknote channel, whether or not the code of the light emission unit of which the light is received by the light receiver changes;

S45*b*: if not changing, acquiring a location of the light emission unit of which the light is received by the light receiver according to the code of the light emission unit of which the light is received by the light receiver;

for example, during the course when the banknote is passing through the banknote channel, the 16 light emission units emits light cyclically by following a preset timing sequence, and the codes of the light emission units received by the light receiver are always the 6 light emission units of L1, L2, L3, L14, L15, and L16, and this indicates the locations of the light emission units blocked by the banknote do not change, indicating the banknote is neither skew, nor defective.

S46*b*: determining a size of the banknote that is passing through the banknote channel according to the location of the light emission unit of which the light is received by the light receiver.

If the locations of the light emission units blocked by the banknote does not change, then the size of the banknote can be accurately calculated according to the situation of blocking. Here, the size of the banknote can be the width of the banknote or the length of the banknote. When the banknote is moving in a lengthwise direction thereof to pass through the banknote channel, what is detected is the width of the banknote; and when the banknote is moving in a widthwise direction to pass through the banknote channel, what is detected is the length of the banknote.

Since the location of each of the light emission units in the validation device is set in advance, the size of the banknote can be determined according to the location of each of the light emission units that blocks light. For example, light from the 10 light emission units of L4, L5, L6, L7, L8, L9, L10, L11, L12, and L13 is blocked by the banknote in the banknote channel, then the distance between the two light emission units, L4 and L13, at edges is the size of the banknote. When the number of the light emission units is increased, the spacing distance between two adjacent light emission units is decreased, and the result of detection is more accurate.

In other embodiments, a process of sampling and averaging may be applied to enhance the measurement of the width of the banknote. Assuming the width of the banknote is fixed, then making sampling of the width of the entire banknote would increase the accuracy as follows:

$$W = \frac{\sum_{i=0}^{n} W_i}{n},$$

where W indicates the widthwise size with accuracy enhanced eventually by taking measurement for n times, and $W_i$ is the width of the ith measurement.

Figure 9:
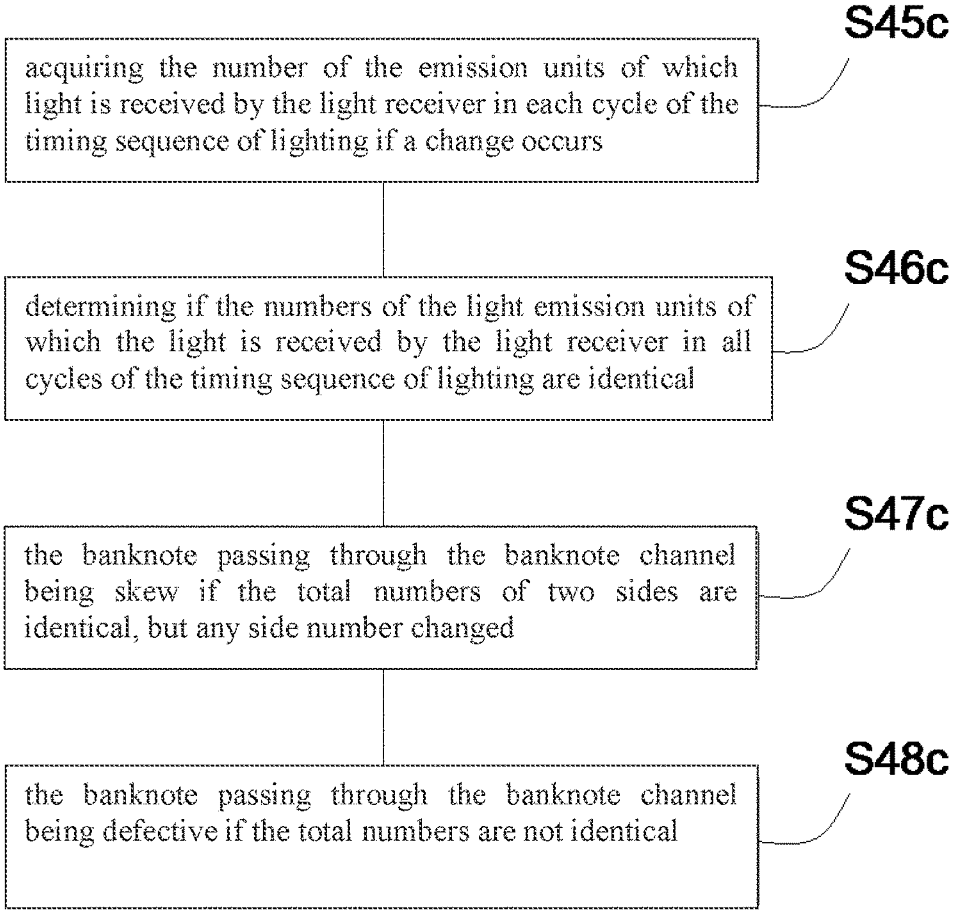
FIG. 9 is a flow chart showing a method for detecting if a banknote is defective or skew.

As shown in FIG. 9, on the basis of the previous embodiment, the instant embodiment provides a specific method for identifying if a banknote is skew in the banknote channel, and the following steps are further included after S44*b*: determining, during the course when the banknote is gradually passing through the banknote channel, whether or not the code of the light emission unit of which the light is received by the light receiver changes:

S45*c*: acquiring the number of the emission units of which light is received by the light receiver in each cycle of the timing sequence of lighting if a change occurs;

for example, if during one cycle of timing sequence of lighting, the 16 light emission units of L1, L2, L3, L4, L5, L6, L7, L8, L9, L10, L11, L12, L13, L14, L15, and L16 emit light sequentially, and in a first light emission cycle, light emitting from m1 light emission units is received by the light receiver; in a second light emission cycle, light emitting from m2 light emission units is received by the light receiver; . . . in a kth light emission cycle, light emitting from mk light emission units is received by the light receiver.

S46*c*: determining if the numbers of the light emission units of which the light is received by the light receiver in all cycles of the timing sequence of lighting are identical;

S47*c*: the banknote passing through the banknote channel being skew if the total numbers of two sides are identical, but any side number changed;

When the banknote is skew, the light emission units that are blocked may vary, yet if the angle of skewness of the banknote is kept fixed, then the total number of the light emission units of the two sides blocked by the banknote is not changed. For example, when m1=m2 . . . mk, this indicates that the banknote is skew in the banknote channel.

Figure 10:
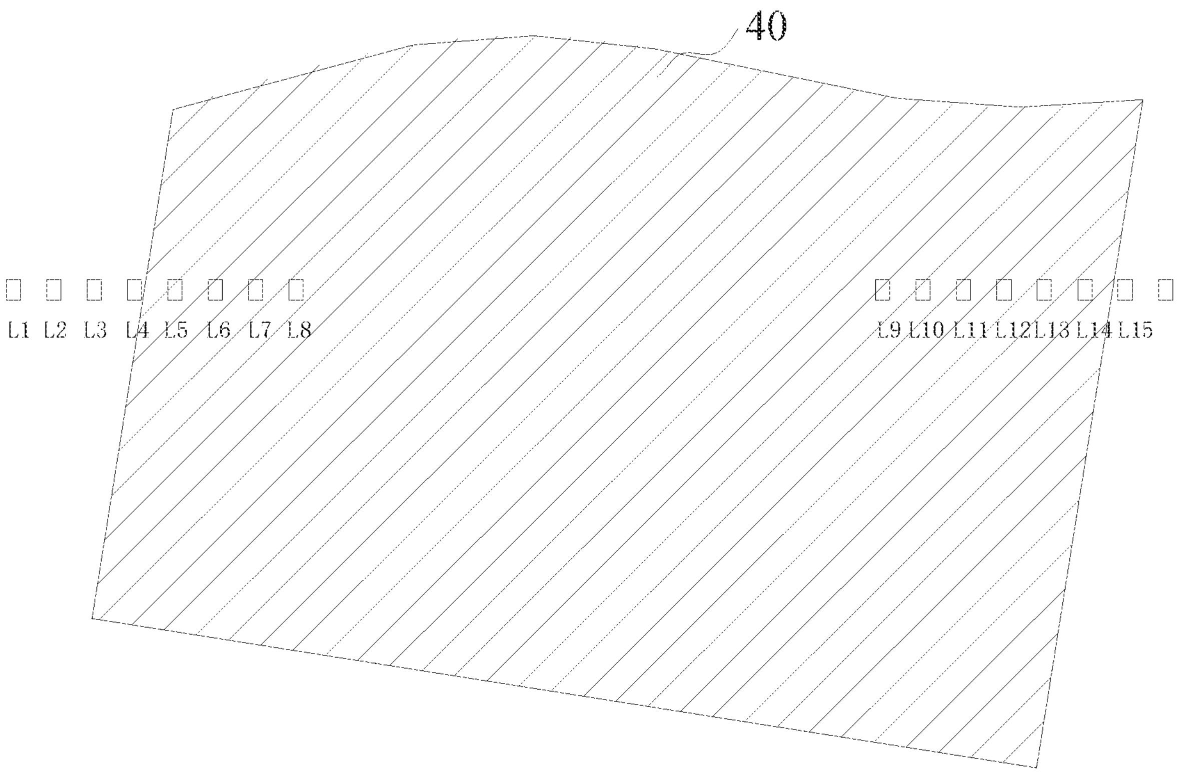
FIG. 10 is a schematic view showing a situation in which a banknote in a skew state blocks the light emission units at a position in a banknote channel.
Figure 11:
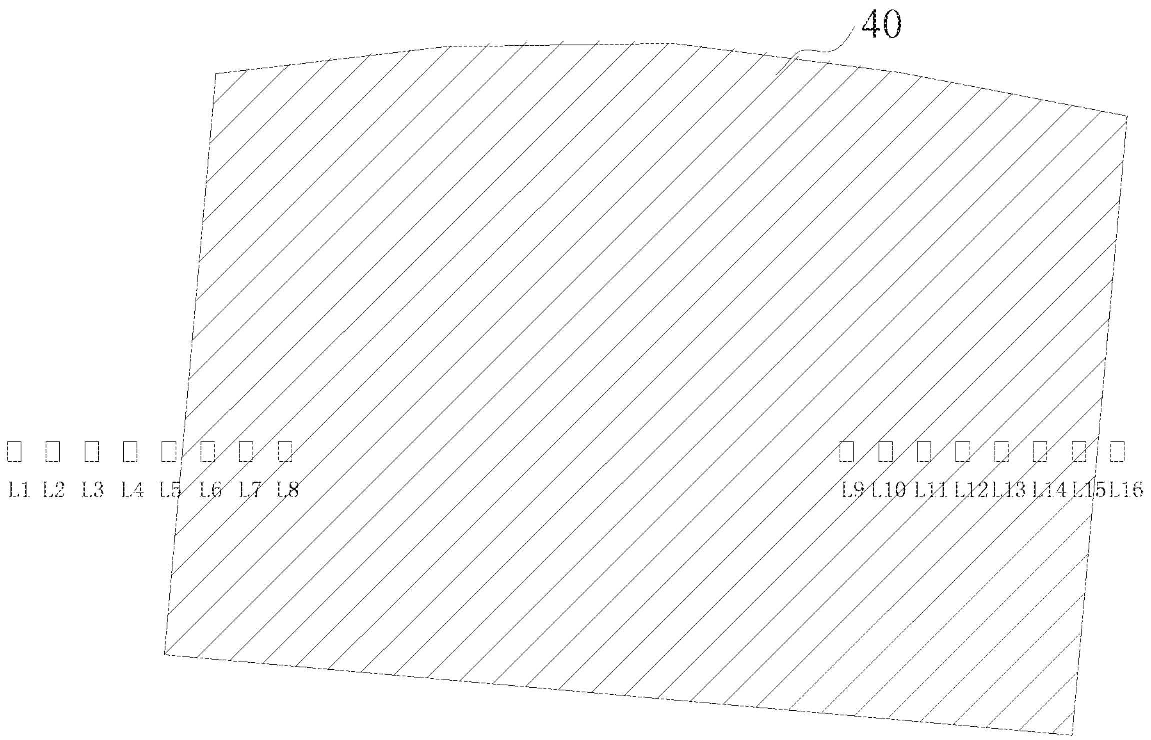
FIG. 11 is a schematic view showing a situation in which a banknote in a skew state blocks the light emission units at a position in a banknote channel.

As shown in FIG. 10, the banknote is skew in FIG. 10, and at a specific time point when the banknote in FIG. 10 is passing through the banknote channel, 10 light emission units, which are L5, L6, L7, L8, L9, L10, L11, L12, L13, and L14, are blocked, and as shown in FIG. 11, the banknote, when passing through the banknote channel at a specific time point, blocks 10 light emission units, which are L6, L7, L8, L9, L10, L11, L12, L13, L14, and L15. Although the light emission units that are blocked at the two time points are different, the total numbers of the blocked light emission units are the same.

The instant embodiment allows the determination as to if the banknote is skew to be done by only comparing the numbers of the light emission units of which light is received when the codes of the light emission units of which the light is received. The method is simple and reliable and may realize fast determination as to if a banknote is skew.

S48*c*: the banknote passing through the banknote channel being defective if the total numbers are not identical.

The light emission units blocked by the banknote are changed, and the total number of the light emission units blocked by the banknote is also changed, and this indicates the banknote has a defect in a portion thereof.

Figure 12:
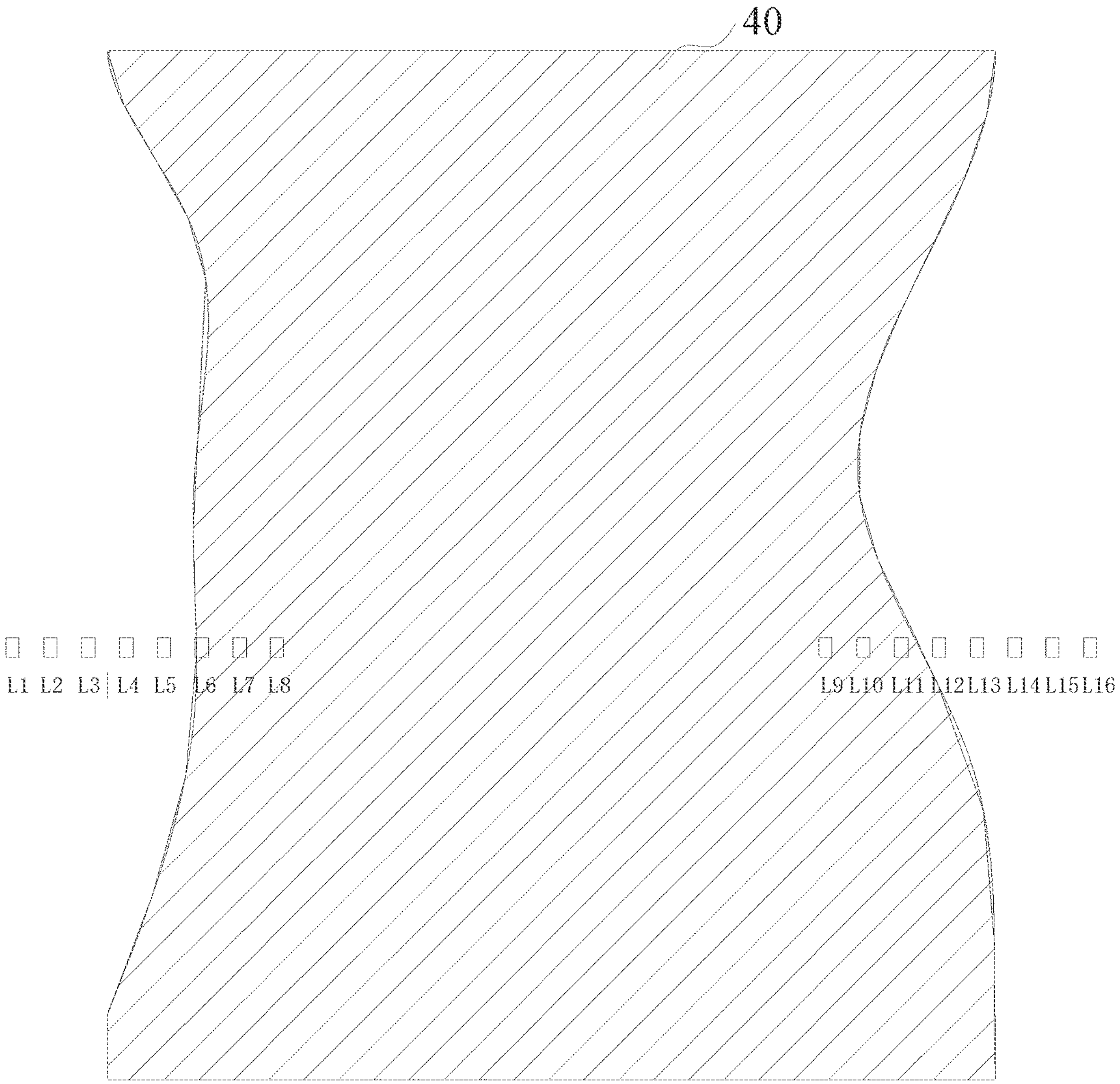
FIG. 12 is a schematic view showing a situation in which a defective banknote blocks the light emission units at a first position in a banknote channel.

As shown in FIG. 12, at a time point when a defective banknote is passing through the banknote channel, 6 light emission units, which are L6, L7, L8, L9, L10, and L11, are blocked.

Figure 13:
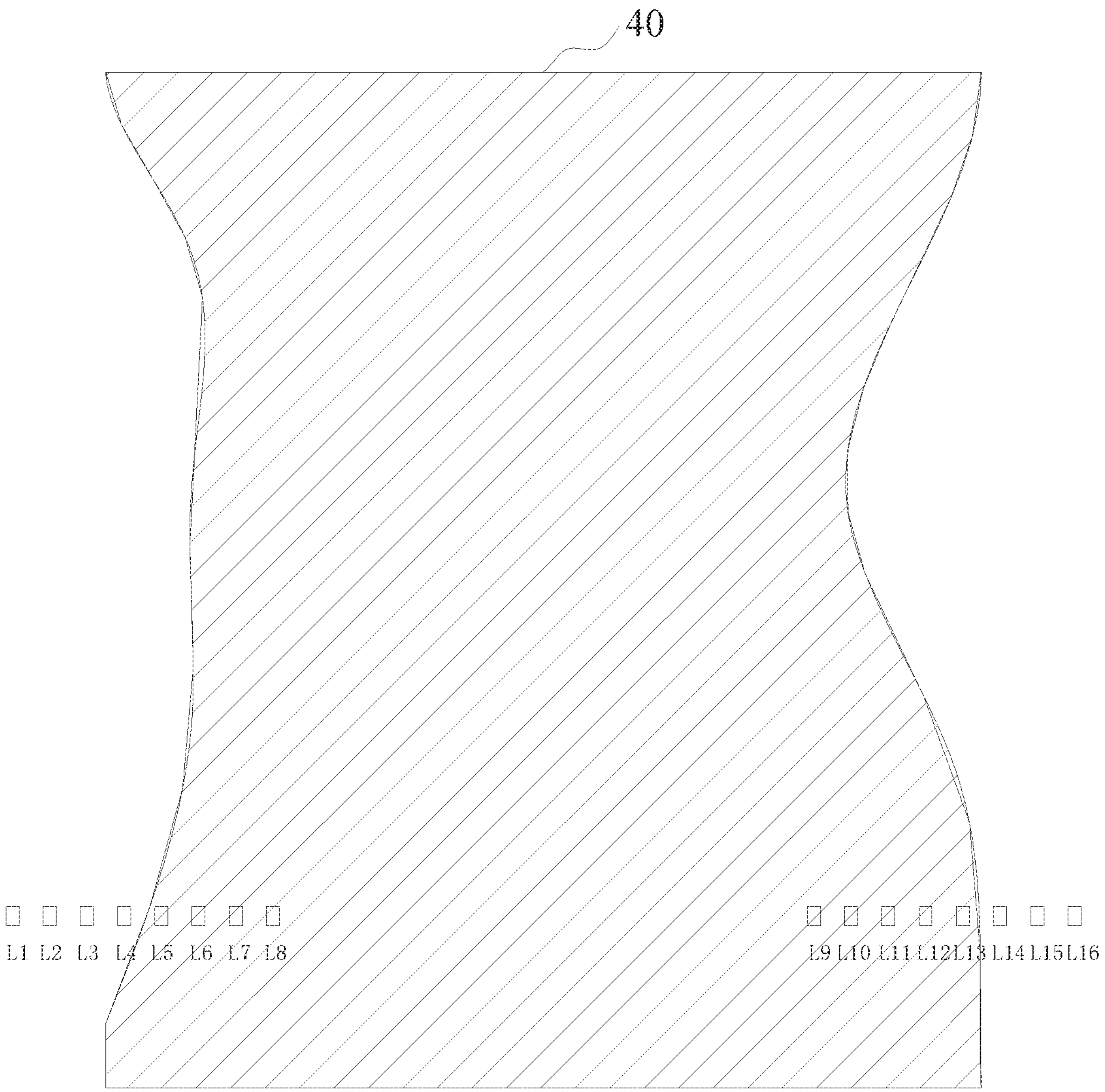
FIG. 13 is a schematic view showing a situation in which a defective banknote blocks the light emission units at a second position in a banknote channel.

As shown in FIG. 13, at a time point when the defective banknote is passing through the banknote channel, 9 light emission units, which are L5, L6, L7, L8, L9, L10, L11, L12, and L13, are blocked.

Figure 14:
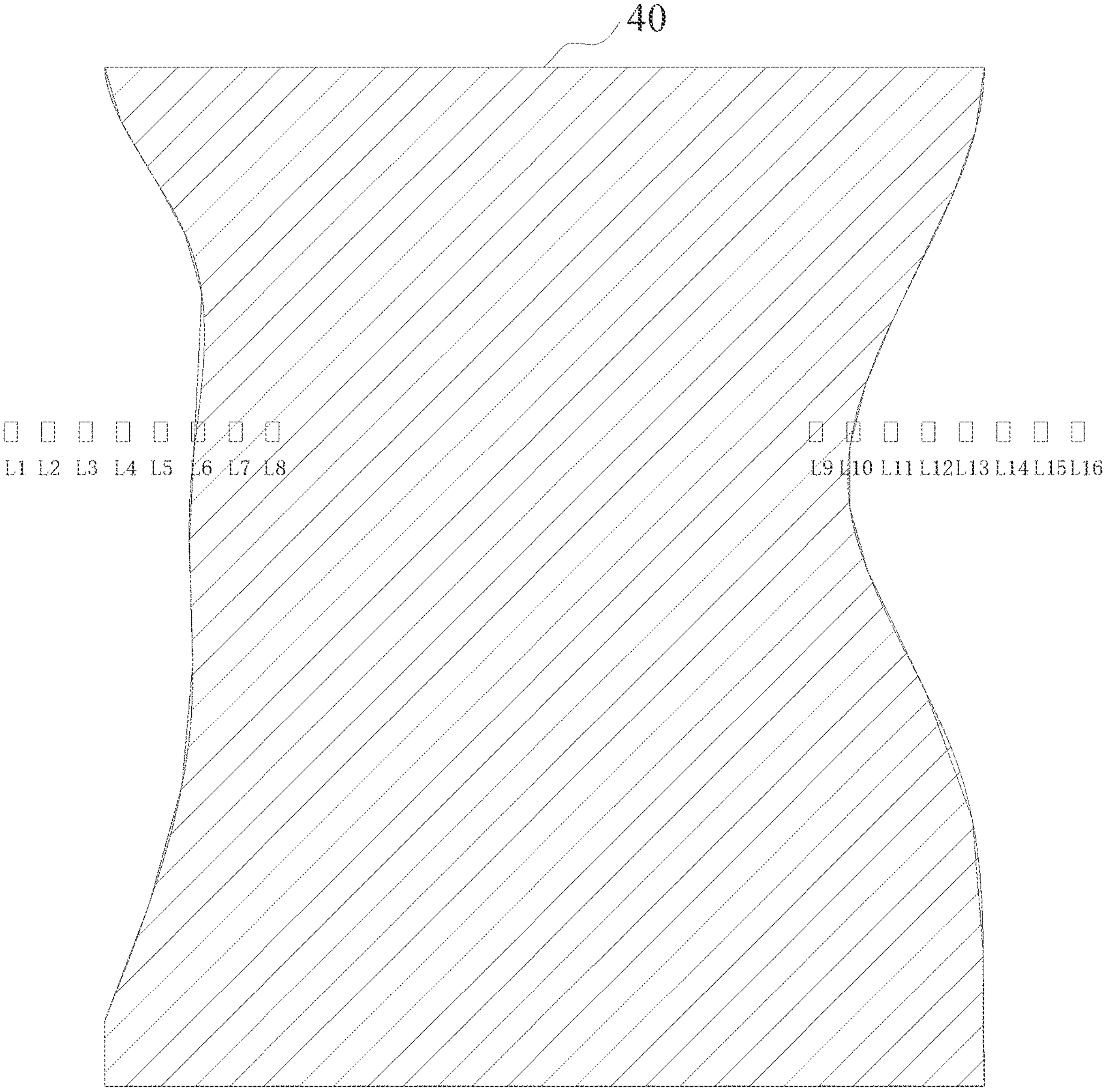
FIG. 14 is a schematic view showing a situation in which a defective banknote blocks the light emission units at a third position in a banknote channel.

As shown in FIG. 14, at a specific time point when the defective banknote is passing through the banknote channel as shown in the drawing, at the time point when the banknote is passing through the banknote channel 4 light emission units, which are L6, L7, L8, L9, and L10, are blocked.

Figure 15:
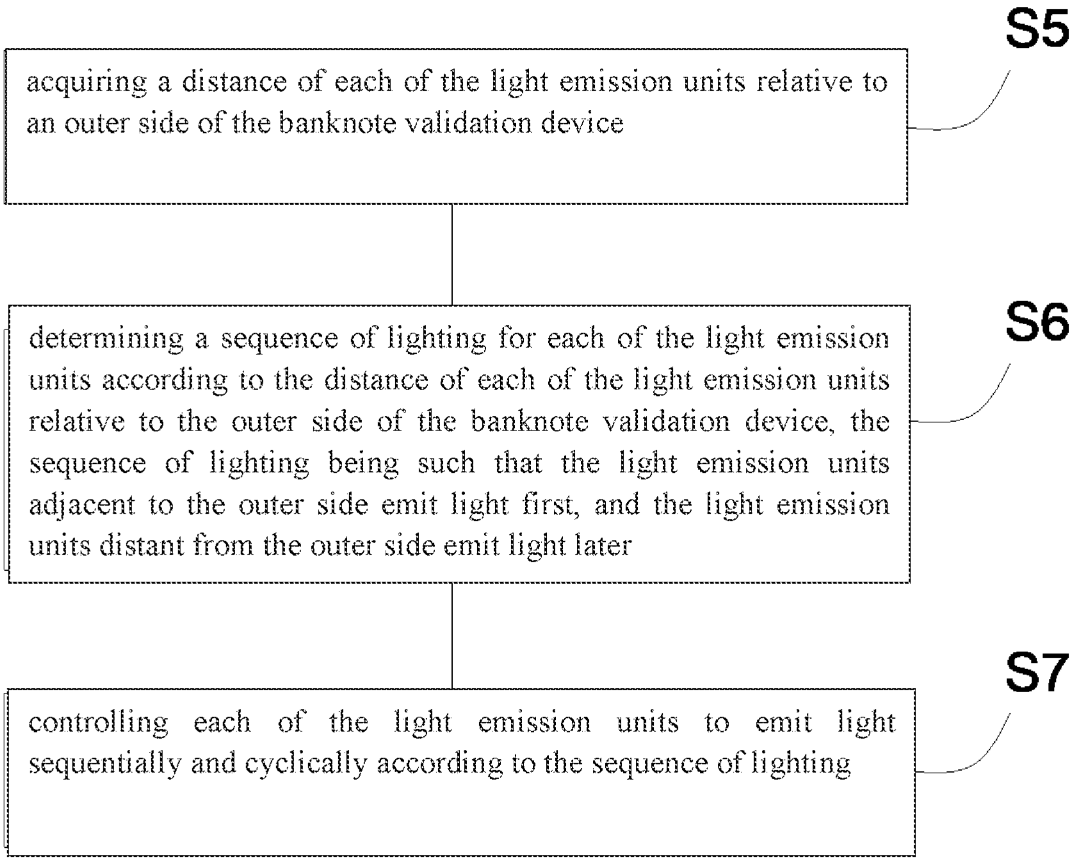
FIG. 15 is a flow chart showing a method for indicating a banknote entry direction by controlling light emission units to sequentially light up.

Further, the instant embodiment also provides a way of indicating a direction for a banknote to get into the banknote channel by having the light emission units lit up in the form of a horse race lamp. In this regard, as shown in FIG. 15, the banknote inspection method further comprises the following steps:

S5: acquiring a distance of each of the light emission units relative to an outer side of the banknote validation device;

S6: determining a sequence of lighting for each of the light emission units according to the distance of each of the light emission units relative to the outer side of the banknote validation device, the sequence of lighting being such that the light emission units adjacent to the outer side emit light first, and the light emission units distant from the outer side emit light later;

S7: controlling each of the light emission units to emit light sequentially and cyclically according to the sequence of lighting;

By adopting the previous method, the light emission units emit light in sequence from outside to inside so as to form an effect of horse race lamp to indicate a direction of guiding a banknote to enter the banknote channel.

Figure 16:
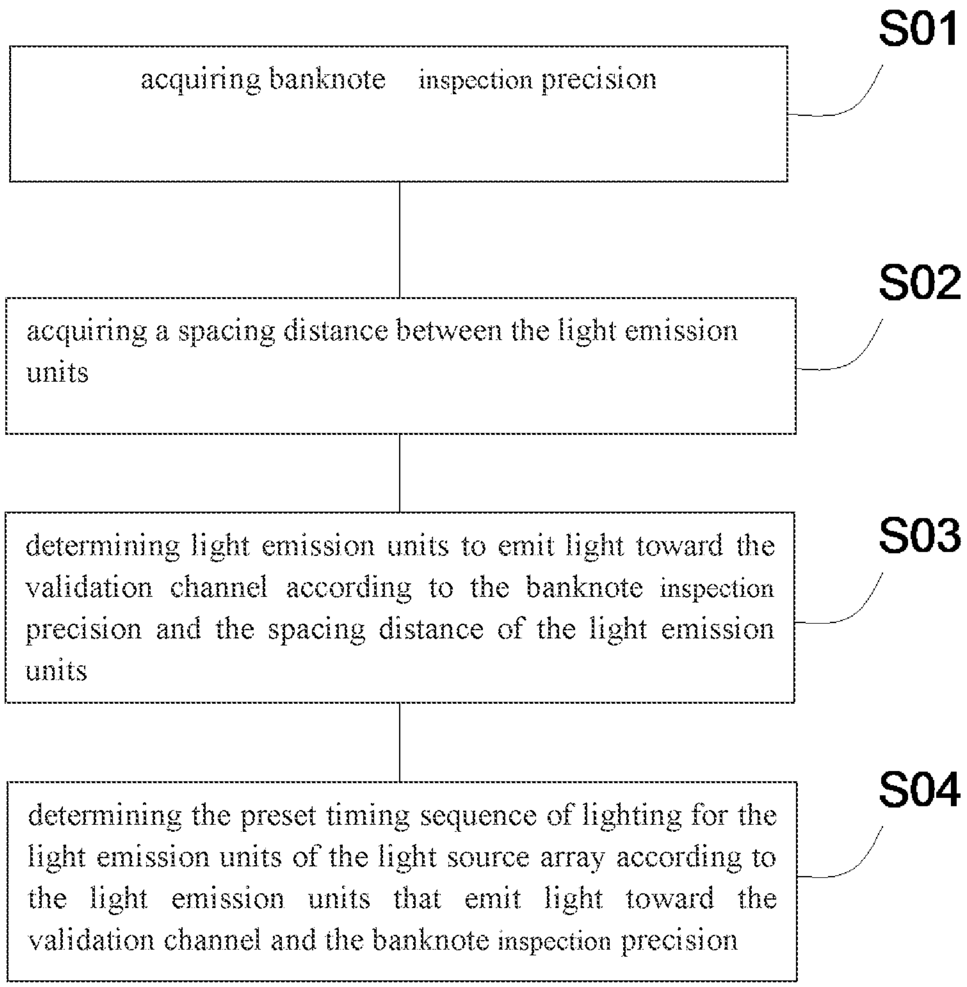
FIG. 16 is a flow chart showing a method for determining a timing sequence of lighting for light emission units according to banknote validation precision.

In different scenarios of application, desired inspection precision can be different, and the smallest distance between the light emission units determines the precision of inspection. However, after the device has been manufactured, the distance between the light emission units is so set. In this regard, the instant embodiment further provides a method applicable for inspection of banknotes with different precisions. As shown in FIG. 16, in the instant embodiment, S1: acquiring a preset timing sequence of lighting for light emission units of a light source array comprises the following steps:

S01: acquiring banknote inspection precision;

wherein the banknote inspection precision can be a magnitude of an error that is allowed in inspection.

S02: acquiring a spacing distance between the light emission units;

for easiness of inspection, the spacing distance for each adjacent ones of the light emission units can be the same.

S03: determining light emission units to emit light toward the validation channel according to the banknote inspection precision and the spacing distance of the light emission units;

assuming the banknote inspection precision is a, and the spacing distance between two adjacent ones of the light emission units is d. The step first determines if the spacing distance between the adjacent light emission units is smaller than the banknote inspection precision, and if not, then a minimum precision that the validation device may achieve is adopted, meaning all the light emission units are determined as light emission units that emit light toward the banknote channel.

If the spacing distance of the adjacent the light emission units is greater than the banknote inspection precision, then the value $j=\{a/d\}$ is calculated, wherein $\{x\}$ indicates the largest integer that is not greater than x. And, then one of the light emission units is picked among every $j-1$ light emission units of the light emission units to serve as a light emission unit that emits light toward the validation channel.

For example, the banknote inspection precision is 3 mm, and the spacing distance between two adjacent light emission units is 1.2 mm, then $a/d=2.5$, $j=\{a/d\}=2$, and there is on light emission unit between adjacent ones of light emission units that emit light toward the validation channel. In this way, the spacing distance between the light emission units is 2.4 mm, which is smaller than the banknote inspection precision, which is 3 mm.

S04: determining the preset timing sequence of lighting for the light emission units of the light source array according to the light emission units that emit light toward the validation channel and the banknote inspection precision.

After the light emission units that emit light have been selected, the step arranges the sequence of lighting for the selected light emission units, so that subsequently, such light emission units can be controlled to emit light according to the banknote inspection precision. By adopting the previous method, a minimum number of the light emission units can be used to meet the requirement for banknote inspection precision, and in other words, while the accuracy of banknote inspection is ensured, the number of the light emission units used is reduced. This not only reduces the energy consumption, but also enhance the efficiency of banknote validation, and the number of light emission units used can be varied according to the banknote inspection precision, so as to realize banknote inspection for different precisions with the minimum number of the light emission units.

Embodiment 3

The instant embodiment provides a banknote processing apparatus. The banknote processing apparatus comprises the banknote validation device described in EMBODIMENT 1. Further, the banknote processing apparatus according to the instant embodiment may further comprises a banknote pressing device of EMBODIMENT 4.

Embodiment 4

Figure 17:
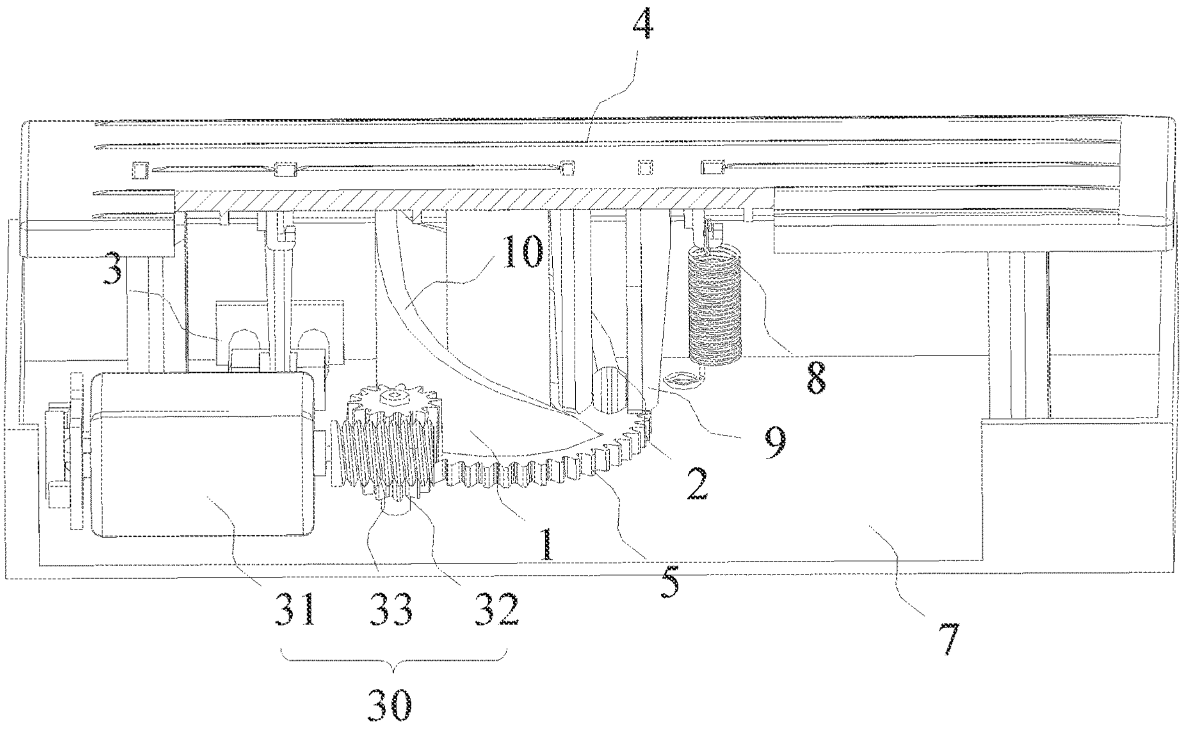
FIG. 17 is a schematic view showing a structure of a banknote pressing device according to the present invention when a press roller is at a lowest position.
Figure 18:
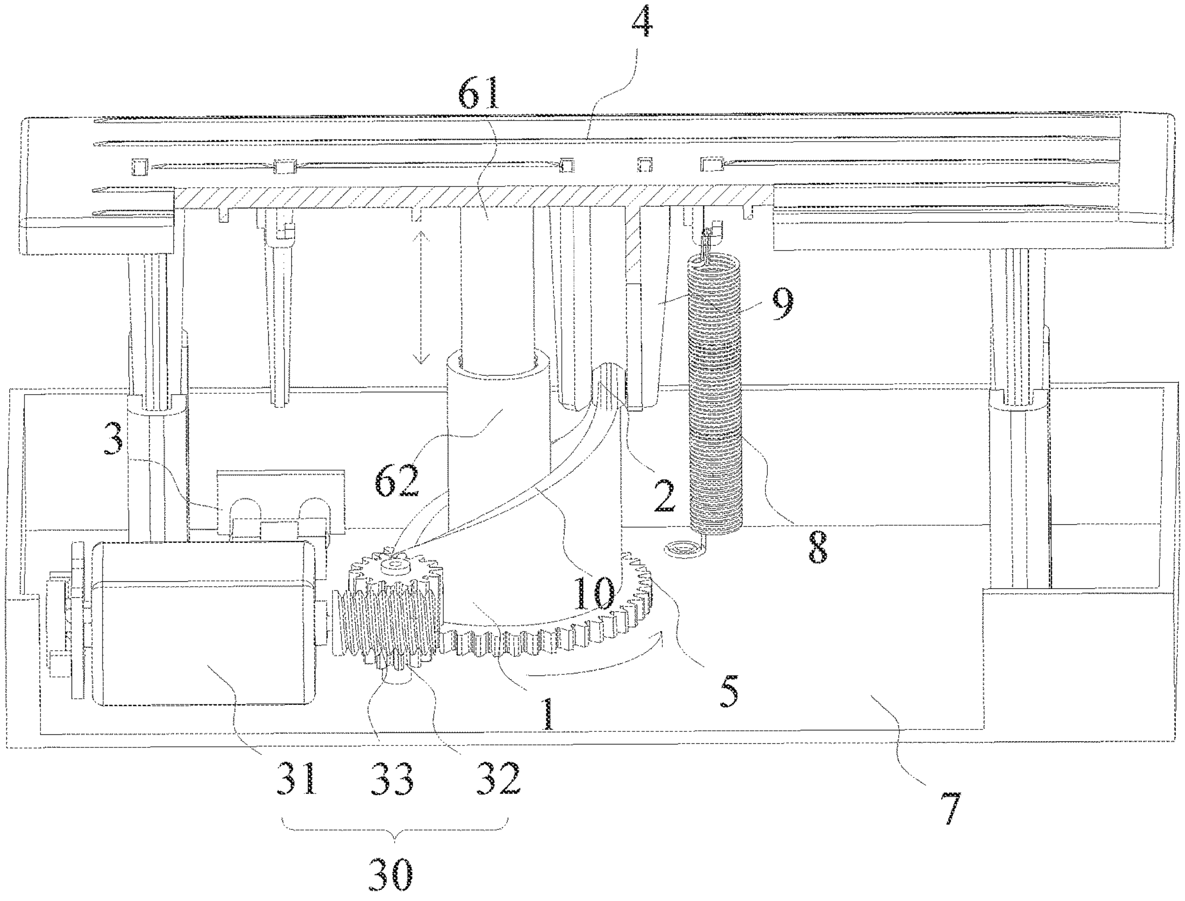
FIG. 18 is a schematic view showing a structure of the banknote pressing device according to the present invention when the press roller is at a highest position.

The instant embodiment provides a banknote pressing device. As shown in FIGS. 17 and 18, the banknote pressing device comprises a cam 1, a press roller 2, a drive device, 30 and a press plate 4. The press plate 4 carries out a linear movement by following a preset rule in order to press the banknote 40 to a preset position. The preset position can be a position for a subsequent processing operation, for example the preset position being in a cash box of a processing apparatus for the banknote 40.

To drive the press plate 4 to carry out the linear movement according to the preset rule, the instant embodiment includes a transmission mechanism comprising the cam 1 and the press roller 2 to drive the press plate 4 to move. One end of the cam 1 is provided with a curved surface 10, and another end opposite thereto is provided with a toothed wheel 5. The cam 1 is rotatable about an axis, and an axis of the toothed wheel 5 coincides with the axis of rotation of the cam 1. The toothed wheel 5 and the curved surface 10 are respectively located at two opposite ends of the cam 1 in a direction of the axis of rotation. In this way, the cam 1 uses the toothed wheel 5 at one end thereof to receive power transmitted from other components of the banknote pressing device to drive the cam 1 to rotate, and the cam 1 uses the curved surface 10 at the other end thereof to drive the press roller 2 to move, and as such, movement input and movement output of the cam 1 do not interfere with each other. To install and mount the primary components of the banknote pressing device, according to the instant embodiment, the banknote pressing device further comprises a supporting frame 7, wherein the cam 1 is mounted, by means of a rotating axle, on the supporting frame 7. As such, the cam 1 is rotatable relative to the supporting frame 7.

One end of the press roller 2 is in contact engagement with the curved surface 10 of the cam 1, and the location of a contact point between the press roller 2 and the curved surface 10 in a first direction varies with the rotation of the cam 1, wherein the first direction is the direction in which the linear movement of the press plate 4 is conducted. To drive the press plate 4 to move, the press roller 2, as a whole, is also made linearly moveable in a direction consistent with the movement of the press plate 4.

The curved surface 10 is arranged in a circumferential direction of rotation of the cam 1, and a height of the curved surface 10, which is the position of the curved surface 10 in the first direction, varies at different circumferential positions of the cam 1.

During a course of rotation of the cam 1, the press roller 2 is constantly kept in tight contact engagement with the curved surface 10 of the cam 1. Except the position being variable in the first direction, movement and rotation of the press roller 2 in other directions are strictly constrained, so that during the course of rotation of the cam 1, the press roller 2 contacts the curved surface 10 at different positions in the circumferential direction of the cam 1. Since the height of the curved surface 10 at different positions of the cam 1 in the circumferential direction are different, the height of the contact point between the press roller 2 and the curved surface 10 also changes. As such, the curved surface 10 of the cam 1, in the course of rotation with the cam 1, drives the press roller 2 to do linear movement in the first direction by means of the change of the height of the contact point thereof with the press roller 2. As the other end of the press roller 2 is connected to the press plate 4, the press roller 2, when conducting the linear movement along the curved surface 10 of the cam 1, drives the press plate 4 to do linear movement therewith.

In the instant embodiment, the cam 1 rotating to a lowest position of the press roller 2 is an initial state of banknote pressing in which the banknote press plate is at a lowest position as shown in FIG. 17. As shown in FIG. 18, where a motor rotates the cam 1 to gradually lift up the press roller 2, the banknote press plate is lifted upward with the curved surface 10 of the cam 1 to reach the banknote pressing position. In the instant embodiment, the cam 1 is applied to drive the press roller 2 to move along the pre-established curved surface 10 so as to have the press plate 4 to do linear movement according to the idealist banknote pressing efficiency.

Figure 19:
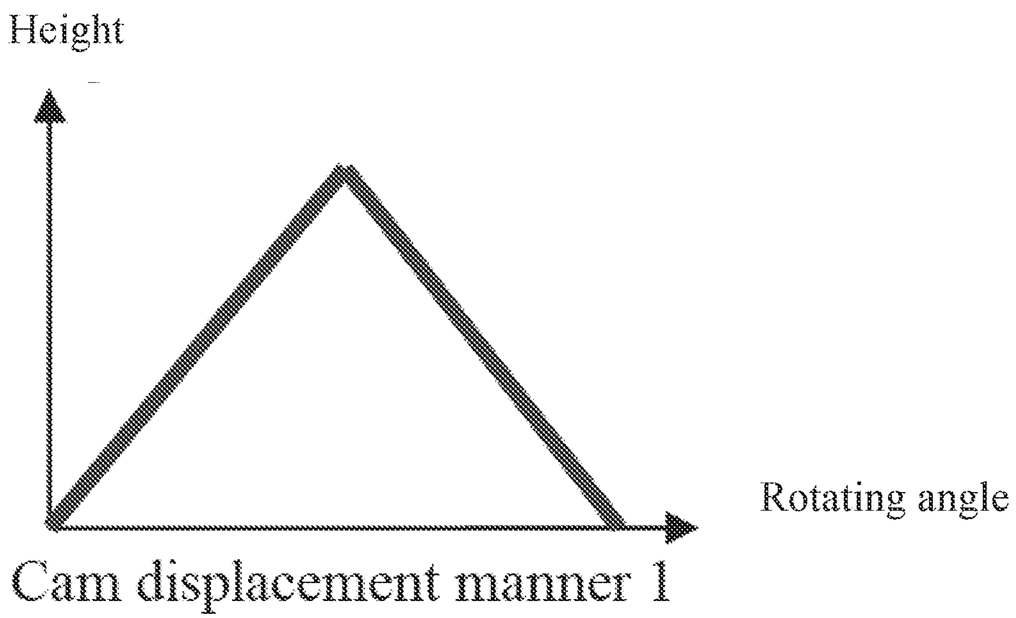
FIG. 19 is a schematic view showing a first cam curve of the banknote pressing device according to the present invention.

The instant embodiment also provides multiple rules for the height of the curved surface 10 of the cam 1 to vary with rotation of the cam 1. The first rule is shown in FIG. 19, in which the height of the curved surface 10 of the cam 1 rises first and then falls, and the rising course and the falling course are both slopes, meaning the rising height and the falling height are both of a proportional relationship with respect to a rotating angle of the cam 1.

Figure 20:
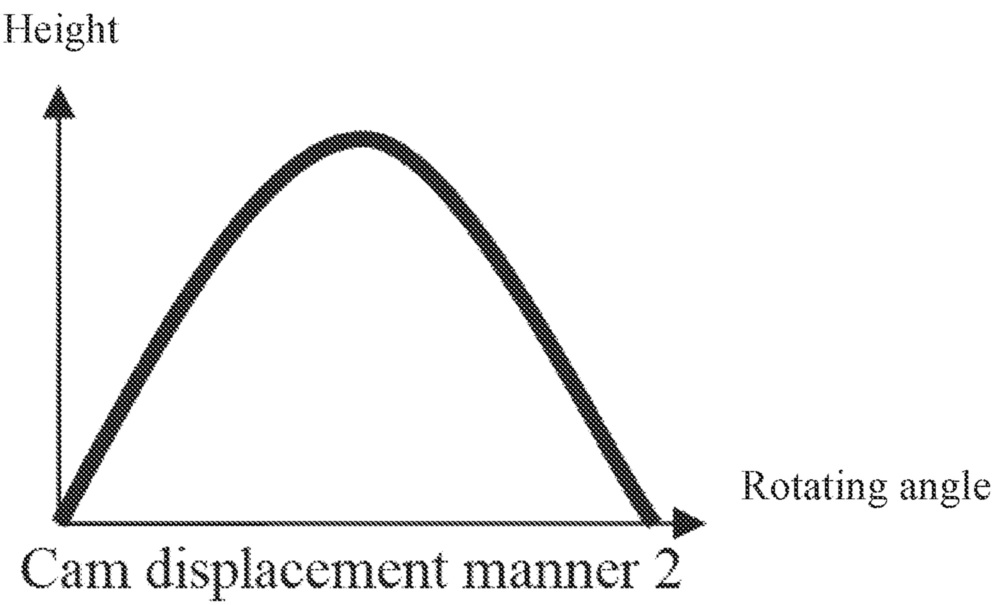
FIG. 20 is a schematic view showing a second cam curve of the banknote pressing device according to the present invention.

The second rule is shown in FIG. 20, in which the curved surface 10 of the cam 1 first rises rapidly around an initial position, a rising rate being gradually slowed down during a course from a lowest position to a highest position until the rising rate becomes 0 at the highest position, and then gradually enters a falling course. When the curved surface 10 of the cam 1 falls from the highest position to the lowest position, a falling rate of the cam 1 gradually increases from low to high.

Figure 21:
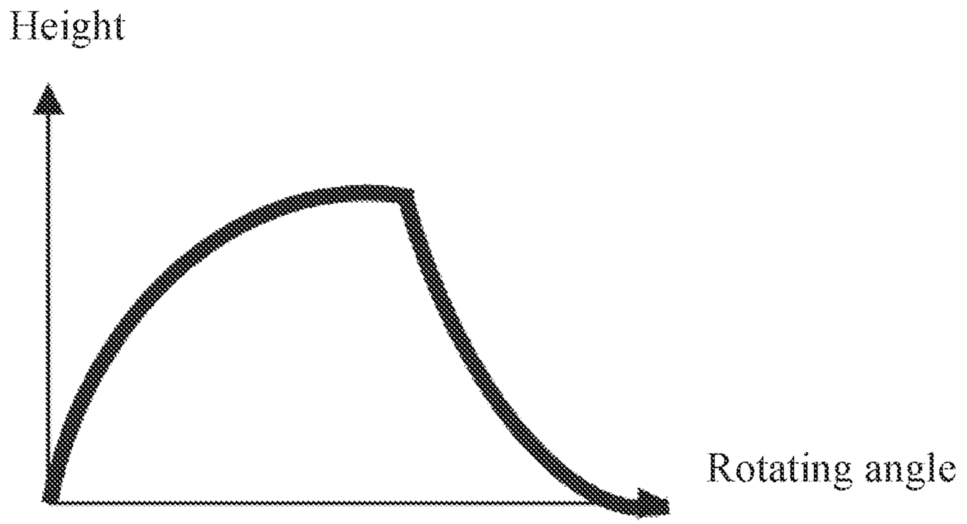
FIG. 21 is a schematic view showing a third cam curve of the banknote pressing device according to the present invention.

The third rule is shown in FIG. 21, in which the curved surface 10 of the cam 1 first rises rapidly around an initial position, a rising rate being gradually slowed down during a course from a lowest position to a highest position until the rising rate becomes 0 at the highest position, and then gradually enters a falling course, a falling rate of the cam 1 in the falling course being gradually reduced from high to low.

As an optional, but preferred way of embodiment, an axial direction of the cam 1 is parallel with a moving direction of the press roller 2. By adopting the previous way, a size of the cam 1 in the axial direction thereof can be reduced, and a mounting space can be saved.

To drive the toothed wheel 5 to rotate, the instant embodiment further comprises a drive device 30. An output end of the drive device 30 outputs power to the toothed wheel 5, so as to drive the cam 1 to rotate by means of the rotation of the toothed wheel 5.

As an optional, but preferred way of embodiment, in the instant embodiment, the toothed wheel 5 and the cam 1 are integrated together as a one-piece structure, namely the toothed wheel 5 and the cam 1 are manufactured as one piece. This can greatly simplify the transmission mechanism for driving the cam 1 to rotate.

In the instant embodiment, the drive device 30 comprises a driver 31, a worm 32, and a worm gear 33. An output end of the driver 31 is connected to the worm 32. The worm 32 meshes with the worm gear 33. The worm gear 33 meshes with the toothed wheel 5. An axial direction of the worm 32 and an axial direction of the toothed wheel 5 are perpendicular to each other. The drive device 30 can be an electrical machine. An output spindle of the electrical machine is connected to the worm 32. Rotational axes of the worm 32 and the worm gear 33 are perpendicular to each other. When the electrical machine is put in operation, the output spindle drives the worm 32 to rotate, and the worm 32 drives the worm gear 33 in mesh therewith to rotate, and the worm gear 33 in turn drives the toothed wheel 5 in mesh therewith to rotate. Adopting the previous way of driving makes the entire structure for driving the cam 1 to rotate compact, greatly reducing the space occupied thereby.

To realize reliable connection between the press roller 2 and the press plate 4, the banknote pressing device according to the instant embodiment further comprises at least two support members 9. The support members 9 are connected, at one end thereof, to the press plate 4, and the press roller 2 is mounted between the support members 9 by means of a rotary axle.

In specific implementation, the rotary axle is mounted between the two support members 9. The two support members 9 are spaced by a predetermined distance, and the rotary axle extends through a hole formed in the press roller 2. In this way, the press roller 2 is rotatable relative to the support members 9. During a course of rotation of the cam 1, the press roller 2 is driven by the cam 1 to linearly move in the first direction, while rotating around the rotary axle relative to the support members 9, thereby converting sliding friction between a pressing force and the curved surface 10 of the cam 1 into rolling friction, so as to significantly reduce the friction between the press roller 2 and the curved surface 10.

To easily and accurately acquire the position of the press plate 4, in the instant embodiment, the banknote pressing device further comprises a position detection sensor 3. The position detection sensor 3 is used to detect the position where the press plate 4 is located. The instant embodiment may identify if movement of the press plate 4 is normal in a banknote validation process according to the position of the press plate 4.

To ensure that the press plate 4 accurately follows a preset direction to conduct a linear movement, the banknote pressing device of the instant embodiment further comprises a guide mechanism. The cam 1 is connected to the press plate 4, in a relatively movable manner, by means of the guide mechanism. The guide mechanism functions to constrain the cam 1 and the press plate 4 from conducting linear movement in a preset direction in a relative manner.

The guide mechanism is connected to both the cam 1 and the press plate 4, so as to have the cam 1 indirectly connected to the pressing force. Although such a connecting relationship allows for relative movement between the cam 1 and the press plate 4, the relative movement between the two is constrained by the guide mechanism, and such a constraint makes the relative movement between the cam 1 and the press plate 4 a relative movement in a linear direction only, and the direction of the relative movement is a guide direction of the guide mechanism, which, in the instant embodiment, is specifically the direction of linear movement of the press plate 4 in pressing a banknote. The guide mechanism can be a guide rod 61 and a guide sleeve 62; a slide block and a slide chut; a slide block and a slide rail.

As an embodiment, the guide mechanism comprises the guide rod 61 and the guide sleeve 62. The guide sleeve 62 is connected to the cam 1, and the guide rod 61 is connected to the press plate 4. The guide sleeve 62 is sleeved over the guide rod 61. In this way, the guide sleeve 62 is allow to do linear movement relative to the guide rod 61 in an axial direction of the guide rod 61. Since the cam 1 and the press plate 4 are respectively connected to the guide sleeve 62 and the guide rod 61, the cam 1 and the press plate 4 are allow to do linear movement in the axial direction of the guide rod 61. Thus, it only needs to set the axial direction of the guide rod 61 as the linear direction of movement of the press plate 4 in pressing a banknote.

As another embodiment, the guide sleeve 62 is connected to the press plate 4, while the guide rod 61 is connected to the cam 1, the guide sleeve 62 being sleeved over the guide rod 61. Compared to the previous solution, this embodiment only switches the positions of the guide rod 61 and the guide sleeve 62, and principle and function are the same as those of the previous embodiment, and repeated description is omitted here.

As an optional, but preferred way of embodiment, in the instant embodiment, the cam 1 is arranged as a hollow cylindrical form, in order to reduce the weight. The curved surface 10 serves as a side wall of the cylinder. The guide rod 61 or the guide sleeve 62 that is connected to the cam 1 is arranged inside the cylinder, so as to further save a space. The guide rod 61 or the guide sleeve 62 can be integrated with the cam 1 as a one-piece structure.

To make the press roller 2 reliably in secured contact engagement with the curved surface 10 during an entire course of rotation of the cam 1, in the instant embodiment, the banknote pressing device further comprises a supporting frame 7 and a return spring 8. The supporting frame 7 is connected to the cam 1, and the return spring 8 has one end connected to the supporting frame 7 and an opposite end connected to the press plate 4. The return spring 8 is set in a tensioned state, and as being acted upon by a tensioning force of the return spring 8, the press plate 4 drives the press roller 2 to get in tight abutting engagement with the curved surface 10. In this way, the press roller 2 may strictly follow the height change of the curved surface 10 to do the linear movement.

It is noted that the present invention is not limited to the specific arrangement and processing discussed above and those shown in the drawings. For simplicity, details concerning known art are omitted herein. Further, in the embodiments described above, certain specific steps are provided as examples; however, the present invention is not limited to such specific steps so described and illustrated in the disclosure, and those skilled in the art may contemplate various variations, modifications, and additions, on rearrangement of such steps, based on the disclosure.

It is also noted here that the illustrative examples or embodiments discussed herein are methods or systems that are based on a sequence of steps or a combination of arrangements. However, the present invention is not limited to such a sequence of the steps. In other words, the method of the present invention can be implemented by following the sequence of the steps discussed above, or it can be implemented in a sequence that is different from what discussed above, or it can be implemented by having some of such steps performed simultaneously.

The embodiments provided above illustrate only some specific ways of embodying the present invention. Those having ordinary skill in the art may readily appreciate that operations of the systems, modules, and units discussed above may refer to a corresponding process of the method discussed in the previous embodiment, and thus, details are omitted herein. It is appreciated that the scope of protection for the present invention is not limited to what discussed above, and those having ordinary skill in the art may readily envisage various equivalent modifications or substitutions based on the disclosure made herein, and such equivalent modifications and substitutions should be construed falling within the scope of the claims appended in the following.

What is claimed is:

1. A banknote validation device, comprising:

a light source array, which comprises a number of light emission units arranged in at least one row;

at least one light receiver, which is operable to receive light emitting from the light emission units and to generate, upon receiving the light emitting from the light emission units, a detection signal corresponding thereto;

a banknote channel, which is arranged between the light source array and the light receiver, the banknote channel being adapted to receive a banknote to be validated to pass therethrough, the at least one light receiver being arranged to correspond to multiple light emission units of the light source array, such that when no banknote is present in the banknote channel, the light emitting from the light emission units toward the banknote channel is all receivable by the light receiver corresponding thereto; and when the banknote to be validated is passing through the banknote channel and blocks the light emitting from at least a portion of the light emission units, the light emitting from the light emission units that are blocked toward the banknote channel is unreceivable by the corresponding light receiver; and a control circuit, which is electrically connected to the light source array and the light receiver, the control circuit being operable to control the light emission units of the light source array to sequentially emit light according to a preset timing sequence of lighting, the control circuit being operable to implement inspection of the banknote passing through the banknote channel according to the detection signal generated by the light receiver.

2. The banknote validation device according to claim 1, wherein the light receiver comprises a receiving device and a light guide, the light guide being arranged to collect light emitting from the light emission units corresponding to the light receiver and transmit the light toward the receiving device, the receiving device generating the detection signal upon receiving the light.

3. The banknote validation device according to claim 1, wherein the banknote validation device further comprises a light reflecting device, the light reflecting device being arranged to reflect the light from the light emission units toward outside of a banknote entry opening.

4. The banknote validation device according to claim 1, wherein the light source array comprises two sets, and the two sets of the light source array are respectively arranged at two opposite ends of the banknote channel.

5. A banknote inspection method based on the banknote validation device according to claim 1, the method comprising the following steps:

acquiring a preset timing sequence of lighting for the light emission units of the light source array;

controlling the light emission units of the light source array to sequentially emit light according to the preset timing sequence of lighting to illuminate the banknote channel;

acquiring the detection signal that is generated by the light receiver upon receiving the light emitting from the light emission units; and identifying presence/absence of the banknote in the banknote channel, and/or a width of the banknote, and/or presence of a defect in the banknote, and/or the banknote being skew or not according to the detection signal received by the light receiver and the preset timing sequence of lighting.

6. The banknote inspection method according to claim 5, wherein the step of identifying presence/absence of the banknote in the banknote channel, and/or a width of the banknote, and/or presence of a defect in the banknote, and/or the banknote being skew or not according to the detection signal received by the light receiver and the preset timing sequence of lighting further comprises the following steps:

acquiring the number of all the light emission units according to the preset timing sequence of lighting, the timing sequence of lighting indicating different time points at which the light emission units sequentially emit light;

acquiring the number of the detection signals received by the light receiver, wherein the light receiver generates one detection signals each time when the light generated by the light emission units is received;

comparing the number of the detection signals so generated and the number of all the light emission units;

no banknote being present in the banknote channel the number of the detection signal so generated is equal to the number of all the light emission units; and confirming that the banknote is present in the banknote channel the number of the detection signals so generated is smaller than the number of all the light emission units.

7. The banknote inspection method according to claim 5, wherein in the step of controlling the light emission units of the light source array to sequentially emit light according to the preset timing sequence of lighting to illuminate the banknote channel, the light emission units are controlled to sequentially and cyclically emit light to illuminate the banknote channel in a course of the banknote gradually passing through the banknote channel; and the step of identifying presence/absence of the banknote in the banknote channel, and/or a width of the banknote, and/or presence of a defect in the banknote, and/or the banknote being skew or not according to the detection signal received by the light receiver and the preset timing sequence of lighting further comprises the following steps:

acquiring a code for each of the light emission units that emit light toward the banknote channel according to the timing sequence of lighting and a time point of light emission of the light emission unit, the timing sequence of lighting indicating different time points at which light emission units at different locations sequentially emit light;

acquiring a time point at which the light receiver generates each detection signal, wherein the light receiver generates a detection signal each time receiving the light emitting from the light emission units;

according to the time point of each detection signal generated by the light receiver and the time points of light emission of the light emission units, identifying the code of the light emission unit from which the light emits is received by the light receiver;

determining, during the course when the banknote is gradually passing through the banknote channel, whether or not the code of the light emission unit of which the light is received by the light receiver changes;

not changing, acquiring a location of the light emission unit of which the light is received by the light receiver according to the code of the light emission unit of which the light is received by the light receiver; and determining a size of the banknote that is passing through the banknote channel according to the location of the light emission unit of which the light is received by the light receiver.

8. The banknote inspection method according to claim 7, wherein the step of determining, during the course when the banknote is gradually passing through the banknote channel, whether or not the code of the light emission unit of which the light is received by the light receiver changes further comprises the following steps:

acquiring the number of the emission units of which light is received by the light receiver in each cycle of the timing sequence of lighting a change occurs;

determining the numbers of the light emission units of which the light is received by the light receiver in all cycles of the timing sequence of lighting are identical;

the banknote passing through the banknote channel being skew the numbers are identical; and the banknote passing through the banknote channel being defective the numbers are not identical.

9. The banknote inspection method according to claim 5, wherein the banknote inspection method further comprises the following steps:

acquiring a distance of each of the light emission units relative to a banknote entry opening of the banknote validation device;

determining a sequence of lighting for each of the light emission units according to the distance of each of the light emission units relative to the banknote entry opening of the banknote validation device, the sequence of lighting being such that the light emission units adjacent to the banknote entry opening emit light first, and the light emission units distant from the banknote entry opening emit light later; and controlling each of the light emission units to emit light sequentially and cyclically according to the sequence of lighting.

10. The banknote inspection method according to claim 5, wherein the step of acquiring a preset timing sequence of lighting for the light emission units of the light source array comprises the following steps:

acquiring banknote inspection precision;

acquiring a spacing distance between the light emission units;

determining light emission units to emit light toward the validation channel according to the banknote inspection precision and the spacing distance of the light emission units; and determining the preset timing sequence of lighting for the light emission units of the light source array according to the light emission units that emit light toward the validation channel and the banknote inspection precision.

11. A banknote processing apparatus, comprising the banknote validation device according to claim 1.

12. The banknote processing apparatus according to claim 11, wherein the banknote processing apparatus further comprises a banknote pressing device.

13. The banknote processing apparatus according to claim 12, wherein the banknote pressing device further comprises:

a cam, which has an end forming a curved surface and an opposite end provided with a toothed wheel;

a press roller, which has an end in contact engagement with the curved surface of the cam, a location of a contact point between the press roller and the curved surface in a first direction varying with rotation of the cam;

a drive device, which drives the cam to rotate by driving the toothed wheel to rotate; and a press plate, which is connected to the press roller, the press plate being linearly movable with the press roller so as to press the banknote to a preset location.

14. The banknote processing apparatus according to claim 13, further comprising a guide mechanism, wherein the cam is connected, in a relatively movable manner, to the press plate by means of the guide mechanism, the guide mechanism constraining the cam and the press plate to relative linear movement in a preset direction.

15. The banknote processing apparatus according to claim 14, wherein the guide mechanism comprises a guide rod and a guide sleeve, the guide sleeve being connected to the cam, the guide rod being connected to the press plate, the guide sleeve being sleeved over the guide rod.

16. The banknote processing apparatus according to claim 14, wherein the guide mechanism comprises a guide rod and a guide sleeve, the guide sleeve being connected to the press plate, the guide rod being connected to the cam, the guide sleeve being sleeved over the guide rod.

17. The banknote processing apparatus according to claim 13, wherein the banknote pressing device further comprises a supporting frame and a return spring, the supporting frame being connected to the cam, the return spring having one end connected to the supporting frame and an opposite end connected to the press plate.

18. The banknote processing apparatus according to claim 13, wherein the drive device comprises a driver, a worm, and a worm gear, an output end of the driver being connected to the worm, the worm being in mesh with the worm gear, the worm gear being in mesh with the toothed wheel, an axial direction of the worm and an axial direction of the toothed wheel being perpendicular to each other.

19. The banknote processing apparatus according to claim 13, wherein the banknote pressing device further comprises at least two support members, the support members being connected, at one end thereof, to the press plate, the press roller being mounted between the two the support members by means of a rotary axle.

20. The banknote processing apparatus according to claim 13, wherein the banknote pressing device further comprises a position detection sensor, the position detection sensor being operable to detect a position where the press plate is located.

* * * * *